United States Patent
Yanai et al.

(10) Patent No.: US 10,831,121 B2
(45) Date of Patent: Nov. 10, 2020

(54) IMAGE PROCESSING APPARATUS, IMAGE PROCESSING METHOD AND PROGRAM, AND IMAGE DISPLAY APPARATUS FOR CONVERTING IMAGE DATA ACCORDING TO LIGHT INTENSITY UTILIZING OBSERVATION CHARACTERISTICS

(71) Applicant: CANON KABUSHIKI KAISHA, Tokyo (JP)

(72) Inventors: Tomokazu Yanai, Yokohama (JP); Hisashi Ishikawa, Urayasu (JP); Kyohei Kikuta, Tokyo (JP); Satoshi Wada, Machida (JP); Takeshi Yazawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/192,152

(22) Filed: Nov. 15, 2018

(65) Prior Publication Data
US 2019/0156164 A1    May 23, 2019

(30) Foreign Application Priority Data
Nov. 17, 2017   (JP) .................................. 2017-221979

(51) Int. Cl.
*G03G 15/04* (2006.01)
*G06K 15/02* (2006.01)
(Continued)

(52) U.S. Cl.
CPC ... *G03G 15/04018* (2013.01); *G06K 15/1822* (2013.01); *G06K 15/1878* (2013.01);
(Continued)

(58) Field of Classification Search
CPC combination set(s) only.
See application file for complete search history.

(56) References Cited

U.S. PATENT DOCUMENTS

| 9,485,388 B2 | 11/2016 | Kodama et al. |
| 9,734,439 B2 | 8/2017 | Hara et al. |

(Continued)

FOREIGN PATENT DOCUMENTS

JP    2016054356 A    4/2016

*Primary Examiner* — Barbara D Reinier
(74) *Attorney, Agent, or Firm* — Carter, DeLuca & Farrell LLP

(57) ABSTRACT

An image processing apparatus converts, according to light on an image printed based on input image data, the input image data into image data for illumination output superimposed on the image, includes a deriving unit deriving an observing condition, an estimating unit estimating luminance characteristics based on the observing condition and reflectance characteristics corresponding to print image data, an introducing unit introducing target luminance characteristics based on the print luminance characteristics, a setting unit setting illumination converting characteristics converting the input image data into the image data for illumination output based on the print luminance characteristics and the target luminance characteristics, and a converting unit converting gradation of the input image data using the illuminance characteristics, and the introducing unit introducing the target luminance characteristics such that, when reproducing ranges in the print luminance characteristics are different, a linear region of output luminance of relatively large reproducing range becomes larger.

18 Claims, 25 Drawing Sheets

(51) Int. Cl.
*H04N 1/60* (2006.01)
*G03G 15/00* (2006.01)

(52) U.S. Cl.
CPC .......... *H04N 1/603* (2013.01); *H04N 1/6086* (2013.01); *H04N 1/6088* (2013.01); *G03G 15/5016* (2013.01)

(56) References Cited

U.S. PATENT DOCUMENTS

| | | |
|---|---|---|
| 9,749,496 B2 | 8/2017 | Fujimoto et al. |
| 9,832,349 B2 | 11/2017 | Yanai |
| 10,027,848 B2 | 7/2018 | Fuse et al. |
| 10,043,118 B2 | 8/2018 | Sumi et al. |
| 10,057,459 B2 | 8/2018 | Yamamoto et al. |
| 10,063,743 B2 | 8/2018 | Fuse et al. |
| 10,073,370 B2 | 9/2018 | Takikawa et al. |
| 2016/0121620 A1 | 5/2016 | Yanai |
| 2017/0111547 A1 | 4/2017 | Otani et al. |
| 2017/0139363 A1 | 5/2017 | Takikawa et al. |
| 2017/0324885 A1 | 11/2017 | Ochiai et al. |
| 2018/0063381 A1 | 3/2018 | Takesue et al. |
| 2018/0314182 A1* | 11/2018 | Wada ................... G03G 15/043 |
| 2018/0376033 A1* | 12/2018 | Kurita ................... H04N 1/6097 |

* cited by examiner

FIG. 1
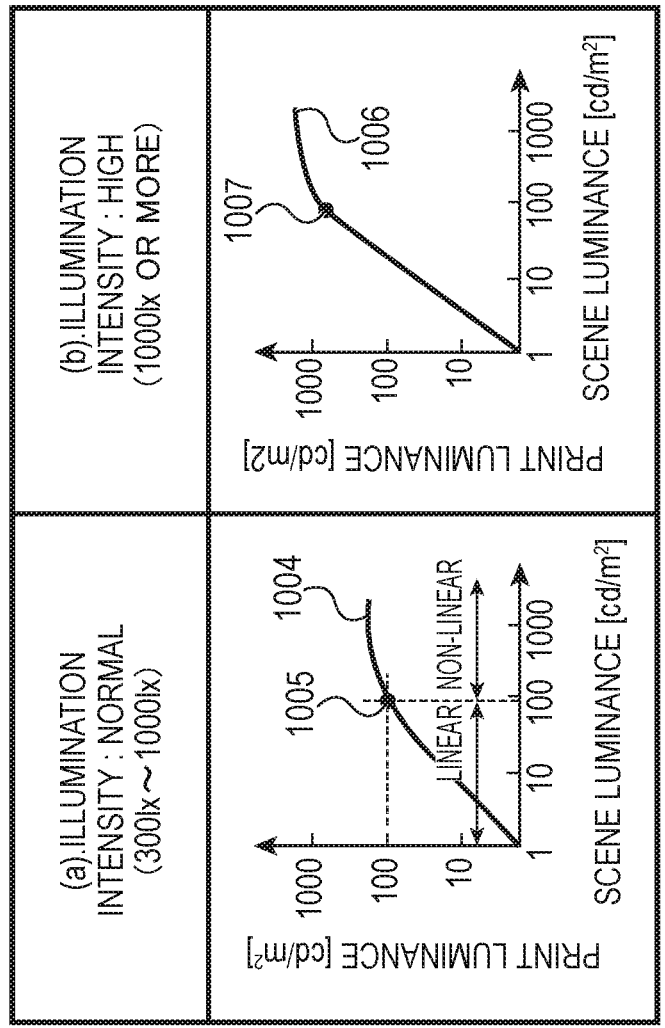
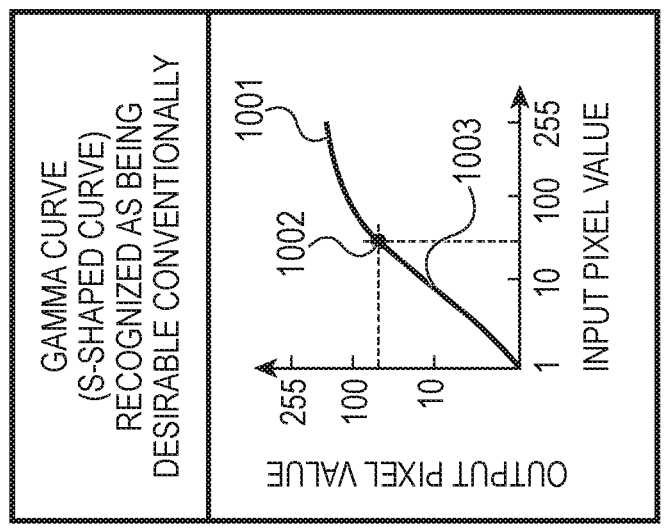

FIG. 5

| LUMINANCE LINEAR INPUT VALUE (R,G,B) | PRINT REFLECTANCE CHARACTERISTICS (DIFFUSE REFLECTANCE CHARACTERISTICS) | | |
|---|---|---|---|
| | X (PdX) | Y (PdY) | Z (PdZ) |
| 255,255,255 | 83.5 | 90.3 | 79.2 |
| 192,192,192 | 78.8 | 86.5 | 75.3 |
| 128,128,128 | 62.2 | 70.6 | 61.8 |
| 64,64,64 | 23.6 | 28.7 | 24.1 |
| 0,0,0 | 0.76 | 0.77 | 0.75 |

FIG. 7

DERIVE OBSERVING ENVIRONMENT

☑ SELECT CANDIDATE

ILLUMINATION INTENSITY ▼

| VERY HIGH (DAYTIME OUTDOOR 10000lx) |
| HIGH (ILLUMINATION IN MUSEUM OF ART 3000lx) |
| NORMAL (OFFICE 800lx) |
| SLIGHTLY DARK(SLIGHTLY DARK OFFICE 400lx) |

☐ NUMERICAL VALUE SETTING 2500    lx 0          5000          10000

IN ORDER TO SET ACCURATE NUMERICAL VALUE,
IT IS DESIRABLE TO PUT ILLUMINANCE METER ON PAPER
FOR MEASUREMENT

FIG. 14

| LUMINANCE LINEAR INPUT VALUE (R,G,B) | PRINT DIFFUSE REFLECTANCE CHARACTERISTICS ||||||
| --- | --- | --- | --- | --- | --- | --- |
| | DIFFUSE REFLECTANCE CHARACTERISTICS ||| SPECULAR REFLECTION CHARACTERISTICS |||
| | X (PdX) | Y (PdY) | Z (PdZ) | X (RdX) | Y (RdY) | Z (RdZ) |
| 255,255,255 | 83.5 | 90.3 | 79.2 | 2879.5 | 3020.4 | 2636.8 |
| 192,192,192 | 78.8 | 86.5 | 75.3 | 5735.1 | 6283.8 | 6217.1 |
| 128,128,128 | 62.2 | 70.6 | 61.8 | 7435.1 | 7611.8 | 7553.2 |
| 64,64,64 | 23.6 | 28.7 | 24.1 | 4123.8 | 5765.2 | 5611.5 |
| 0,0,0 | 0.76 | 0.77 | 0.75 | 8250.2 | 8250.2 | 7877.8 |

FIG. 15

DERIVE OBSERVING ENVIRONMENT

☑ SELECT CANDIDATE

ILLUMINATION INTENSITY ▼
- VERY HIGH (DAYTIME OUTDOOR 10000lx)
- HIGH (ILLUMINATION IN MUSEUM OF ART 3000lx)
- NORMAL (OFFICE 800lx)
- SLIGHTLY DARK (SLIGHTLY DARK OFFICE 400lx)

LUMINANCE IN LIGHT INCIDENT DIRECTION ▼
- VERY HIGH (WHITE 500cd/m²)
- HIGH (ILIGHT GRAY 200cd/m²)
- NORMAL (GRAY 50cd/m²)
- DARK (BLACK 10cd/m²)

☐ NUMERICAL VALUE SETTING 2500  lx
0      5000    10000

100  cd/m²
0      250     500

IN ORDER TO SET ACCURATE NUMERICAL VALUE, IT IS DESIRABLE TO PUT ILLUMINANCE METER ON PAPER FOR MEASUREMENT

IN ORDER TO SET ACCURATE NUMERICAL VALUE, IT IS DESIRABLE TO PUT MIRROR ON SAMPLE SURFACE AND MEASURE LUMINANCE IN LIGHT INCIDENT DIRECTION BY LUMINANCE METER

FIG. 17

| LUMINANCE LINEAR INPUT VALUE (R,G,B) | PRINT REFLECTANCE CHARACTERISTICS | | | | | |
|---|---|---|---|---|---|---|
| | DIFFUSE REFLECTANCE CHARACTERISTICS | | | SPECULAR REFLECTION CHARACTERISTICS | | |
| | X (PdX) | Y (PdY) | Z (PdZ) | X (RdX) | Y (RdY) | Z (RdZ) |
| 255,255,255 | 83.5 | 90.3 | 79.2 | 2879.5 | 3020.4 | 2636.8 |
| 192,192,192 | 78.8 | 86.5 | 75.3 | - | - | - |
| 128,128,128 | 62.2 | 70.6 | 61.8 | 7435.1 | 7611.8 | 7553.2 |
| 64,64,64 | 23.6 | 28.7 | 24.1 | - | - | - |
| 0,0,0 | 0.76 | 0.77 | 0.75 | 8250.2 | 8250.2 | 7877.8 |

IMAGE PROCESSING APPARATUS, IMAGE PROCESSING METHOD AND PROGRAM, AND IMAGE DISPLAY APPARATUS FOR CONVERTING IMAGE DATA ACCORDING TO LIGHT INTENSITY UTILIZING OBSERVATION CHARACTERISTICS

BACKGROUND OF THE INVENTION

Field of the Invention

The present invention relates to a technique for producing an image in which visual change according to an observation environment is suppressed.

Description of the Related Art

Conventionally, image forming apparatuses such as a digital copier and a printer based on various printing schemes such as ink-jet, electrophotography and thermal transfer are in widespread use. Further, it is known that, concerning a print piece created using these image forming apparatuses, visual density (color) of the print piece changes according to an observation environment.

Here, examples of the observation environment can include illumination intensity of lighting provided in the observation environment, and, an image processing technique of suppressing visual change of density of a print piece and making the print piece perceived as intended by a creator even in the case where illumination intensity changes, has been proposed (Japanese Patent Application Laid-Open No. 2016-054356).

Japanese Patent Application Laid-Open No. 2016-054356 discloses an image processing technique of calculating reflected light of an image in an observing condition based on reflectance characteristics of the image and outputting image data for forming an image to be disposed in an observation environment in an image output mode selected according to the calculated reflected light of the image.

SUMMARY OF THE INVENTION

However, with the image processing technique disclosed in Japanese Patent Application Laid-Open No. 2016-054356, at least under an observation environment where illumination intensity is high, a portion from a halftone portion to a highlight portion of a print piece is white skipped, and the print piece is perceived as if imaging were performed in an overexposure state for approximately several levels. That is, there is a problem that, if illumination intensity becomes high, appearance of the print piece changes.

The present invention has been made in view of the above-described problem, and an object of the present invention is to produce an image in which visual change according to an observation environment is suppressed.

To achieve the above-described object, an image processing apparatus of the present invention is an image processing apparatus that converts, according to intensity of light radiated on an image printed based on an input image data, the input image data into image data for illumination output to be superimposed on the image by an illuminating apparatus, includes a producing unit that produces print image data from the input image data using printer gradation converting characteristics, a deriving unit that derives an observing condition upon radiation at illumination intensity of the illuminating apparatus, an estimating unit that estimates print luminance characteristics corresponding to the print image data based on the observing condition and reflectance characteristics corresponding to the print image data, an introducing unit that introduces target luminance characteristics in the observing condition based on the print luminance characteristics, a setting unit that sets illumination converting characteristics for converting the input image data into the image data for illumination output based on the print luminance characteristics and the target luminance characteristics, and a converting unit that converts gradation of the input image data using the illumination converting characteristics, and the introducing unit introduces the target luminance characteristics such that, in the case where reproducing ranges of illumination intensity in the print luminance characteristics are different, a linear region of output luminance in the case where the reproducing range is relatively large becomes larger than a linear region of output luminance in the case where the reproducing range is relatively small.

According to the present invention, it is possible to produce an image in which visual change according to an observation environment is suppressed.

Further features of the present invention will become apparent from the following description of exemplary embodiments with reference to the attached drawings.

BRIEF DESCRIPTION OF THE DRAWINGS

FIG. 1 is a diagram illustrating print luminance which changes according to illumination intensity in a conventional gamma curve.

FIG. 5 is a diagram illustrating print reflectance characteristics held in a reflectance characteristics holding unit.

FIG. 7 is a diagram illustrating a GUI provided by an observing condition deriving unit.

FIG. 14 is a diagram illustrating the print reflectance characteristics held in the reflectance characteristics holding unit.

FIG. 15 is a diagram illustrating the GUI provided by the observing condition deriving unit.

FIG. 17 is a diagram illustrating the print reflectance characteristics held in the reflectance characteristics holding unit.

DESCRIPTION OF THE EMBODIMENTS

Figure 2:
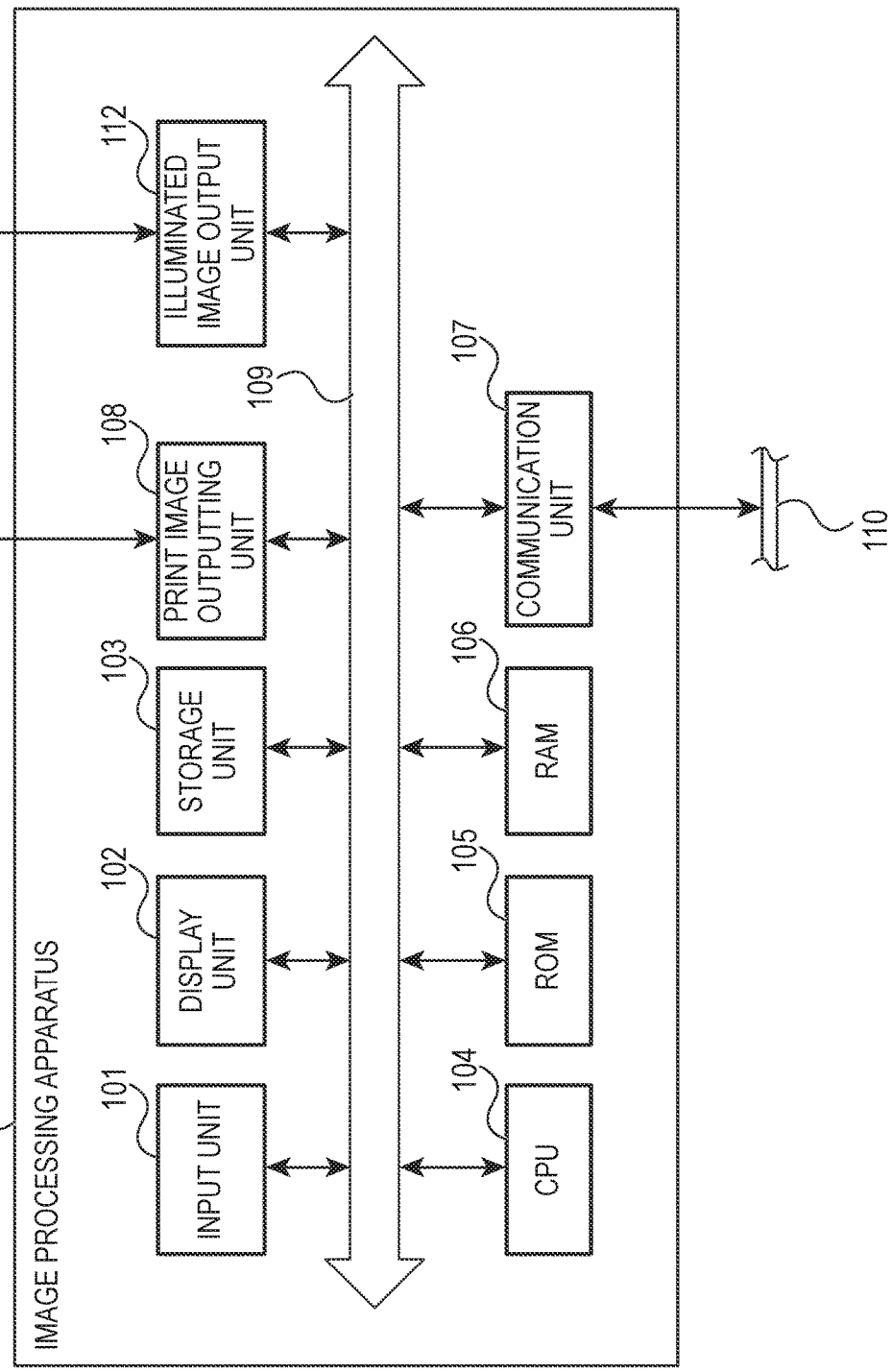
FIG. 2 is a block diagram of an image processing apparatus.

Preferred embodiments of the present invention will now be described in detail in accordance with the accompanying drawings.

Exemplary embodiments of the present invention will be described in detail below with reference to the accompanying drawings. Note that the following embodiments do not limit the present invention, and all of combinations of the features described in the present embodiment are not necessarily essential for means for solving the present invention.

(Brightness of Print Piece Perceived According to Intensity of Illumination)

First, before embodiments of the present invention are described, factors of brightness of a print piece being perceived differently according to illumination intensity in an observation environment will be described using FIG. 1. FIG. 1 is a diagram illustrating relationship between scene luminance [cd/m$^2$] and print luminance [cd/m$^2$] in the case where the illumination intensity is made (a) normal (300-1000 [lx]) and (b) high (equal to or higher than 1000 [lx]) using an input/output characteristics gamma curve which is conventionally considered preferable. Note that, in each drawing, a black circle "●" indicated in the drawing indicates a skin region.

In FIG. 1, in the input/output characteristics gamma curve (S-shaped) 1001 which is conventionally considered preferable, an output pixel value is greater than an input pixel value. Specifically, in a portion from a halftone portion to a highlight portion, that is, in a region (1002) which is convex upward, the output pixel value is greater than the input pixel value, that is, the print piece becomes brighter.

Then, (a) in FIG. 1 illustrates relationship between the scene luminance [cd/m$^2$] and print luminance [cd/m$^2$] in the case where the illumination intensity is made (a) normal (300-1000 [lx]) using the input/output characteristics gamma curve (S-shaped) 1001 which is conventionally considered preferable.

Referring to (a) in FIG. 1, the relationship between the scene luminance and the print luminance is maintained linear in a region where the luminance is equal to or less than a luminance range of an important region (1005) such as a skin region, and values of the luminance are substantially the same. This is because a MAX value of the print luminance seen under a normal illumination (300-1000 [lx]) environment is 100-300 [cd/m$^2$] which is typically narrower than a MAX value (1000 [cd/m$^2$] or more) of actual scene luminance.

That is, while, in the input/output characteristics gamma curve (S-shaped) 1001 which is conventionally considered preferable, the output pixel value is set greater than the input pixel value, the MAX value of the print luminance is 100-300 [cd/m$^2$] and is small. Therefore, as a result, a tilt of the scene luminance and a tilt of the print luminance are substantially the same in a region where the luminance is equal to or less than the luminance range of the important region (1005) such as the skin region.

Note that a region 1003 which is convex downward, of the input/output characteristics gamma curve (S-shaped) 1001 which is conventionally considered preferable is characteristics for correcting black floating of print to be linear. Therefore, as a result, print luminance in a shadow portion is often maintained linear with respect to the scene luminance.

Further, (b) in FIG. 1 illustrates the relationship between the scene luminance [cd/m$^2$] and the print luminance [cd/m$^2$] in the case where the illumination intensity is made (b) high (equal to or higher than 1000 [lx]) using the input/output characteristics gamma curve (S-shaped) 1001 which is conventionally considered preferable.

Referring to (b) in FIG. 1, while the relationship between the scene luminance and the print luminance is maintained linear in a region where the luminance is equal to or less than the luminance range of the important region (1007) such as the skin region, the values of the luminance do not become the same value. This is because the input/output characteristic gamma curve (S-shaped) 1001 which is conventionally considered preferable is non-linear, and the output pixel value is set greater than the input pixel value. That is, although the MAX value of the print luminance and the MAX value of the scene luminance are substantially the same luminance values (approximately 1000 [cd/m$^2$]), the luminance value of the print luminance is obviously set greater by the input/output characteristics gamma curve (S-shaped) which is conventionally considered preferable. By this means, the print piece is perceived as if imaging were performed in an overexposure state for several levels. That is, brightness of the print piece looks different according to the illumination intensity (is visually differently perceived).

Then, to avoid brightness of the print piece from looking different (being differently perceived), it is necessary to estimate print luminance characteristics according to the illumination intensity. Note that the print luminance characteristics can be estimated from at least print diffuse reflectance characteristics and the illumination intensity. In addition, the print luminance characteristics can be estimated with further higher accuracy by using print specular reflection characteristics and light source distribution.

In the following description, in Embodiment 1, print luminance to be perceived by the observer is estimated by a maximum value of illumination intensity at the illuminating apparatus being set as the illumination intensity and by using the print diffuse reflectance characteristics measured in advance. In addition, image processing for producing image data for print output and image data for illumination output according to the observation environment will be described.

Embodiment 1

(Configuration of Apparatus)

FIG. 2 is a block diagram of the image processing apparatus according to the present embodiment. As illustrated in FIG. 2, the image processing apparatus 100 includes an input unit 101, a display unit 102, a storage unit 103, a CPU 104, a ROM 105, a RAM 106, a communication unit 107, a print image outputting unit 108, and an illuminated image output unit 112. Further, these are connected with a system bus 109 so as to be able to perform communication.

Note that the image processing apparatus 100 is realized by supplying programs for realizing image processing which will be described later to computer equipment such as a personal computer, a tablet and a smartphone.

The input unit 101 is a serial bus interface such as a USB (Universal Serial Bus). An input device such as a keyboard and a mouse, and an image input device such as a memory card reader, a digital camera and a scanner are connected to the input unit 101.

The display unit 102, which is a monitor, or the like, displays a user instruction and image data input by the CPU 104 via the input unit 101, and a graphical user interface (GUI), processing process, a processing result, or the like, of image processing. Note that, as described above, in the case where a tablet or a smartphone is utilized as the image processing apparatus 100, the input unit 101 and the display unit 102 are laminated and configured as a touch panel.

The storage unit 103 is a recording medium such as a hard disk drive (HDD) and a solid state drive (SSD) in which various kinds of programs and various kinds of data are stored. Note that the programs stored in the storage unit 103 include programs for realizing image processing which will be described later.

The CPU (Central Processing Unit) 104 executes an OS (Operating System) and various kinds of programs stored in the storage unit 103 or the ROM 105 using the RAM 106 as a work memory. Further, the CPU 104 communicates with a server apparatus, other computer equipment, or the like, on a network 110 via the communication unit 107. Specifically, the CPU 104 receives various kinds of programs and data from the server apparatus, other computer equipment, or the like, on the network 110 and executes processing or provides data of a processing result to the server apparatus, other computer equipment, or the like, on the network 110. Note that the computer equipment with which the CPU 104 can perform communication includes a print image output apparatus 111, and the CPU 104 can also output image data to the print image output apparatus 111 and an illuminating apparatus 113 via the communication unit 107. In addition, the CPU 104 controls components which will be described later via the system bus 109.

As described above, the ROM (Read Only Memory) 105 stores the OS and various kinds of programs. The RAM (Random Access Memory) 106 is used as a work memory for allowing the CPU 104 to operate and as an image memory for temporarily storing image data.

The communication unit 107 is a network interface for connecting to wired or wireless networks such as Ethernet (registered trademark), Bluetooth (registered trademark), Wi-Fi (registered trademark), and P2P.

The print image outputting unit 108 is a serial bus interface such as a USB and outputs image data, or the like, to the print image output apparatus 111 and a memory card writer connected to the serial bus.

The illuminated image output unit 112 is connected to a display port, or the like, and outputs image data, or the like, to the illuminating apparatus 113 which can locally control the illumination intensity. Further, concerning the illuminating apparatus 113, it is also possible to use an image display apparatus such as a projector as substitute for the illuminating apparatus 113.

Note that, in the present embodiment, as will be described later, an image obtained by superimposing the image data output from the illuminating apparatus 113 on the image data output (formed) at the print image output apparatus (image printing apparatus) 111, is output. Further, while FIG. 2 illustrates an example where the image processing apparatus 100, the print image output apparatus 111 and the illuminating apparatus 113 are separately configured, the present invention can be applied to an image forming apparatus in which the image processing apparatus 100 and the print image output apparatus 111 are integrally configured. In addition, the present invention can be also applied to an image display apparatus in which the image processing apparatus 100, the print image output apparatus 111 and the illuminating apparatus 113 are integrally configured.

(Superimposition of Image Data of Print Image Output Apparatus and Illuminating Apparatus)

In the present embodiment, as described above, the image obtained by superimposing the image data output from the illuminating apparatus 113 on the image data output (formed) at the print image output apparatus 111, is output. Then, by the image obtained through superimposition being output in this manner, a luminance range of the output image is expanded.

Figure 20:
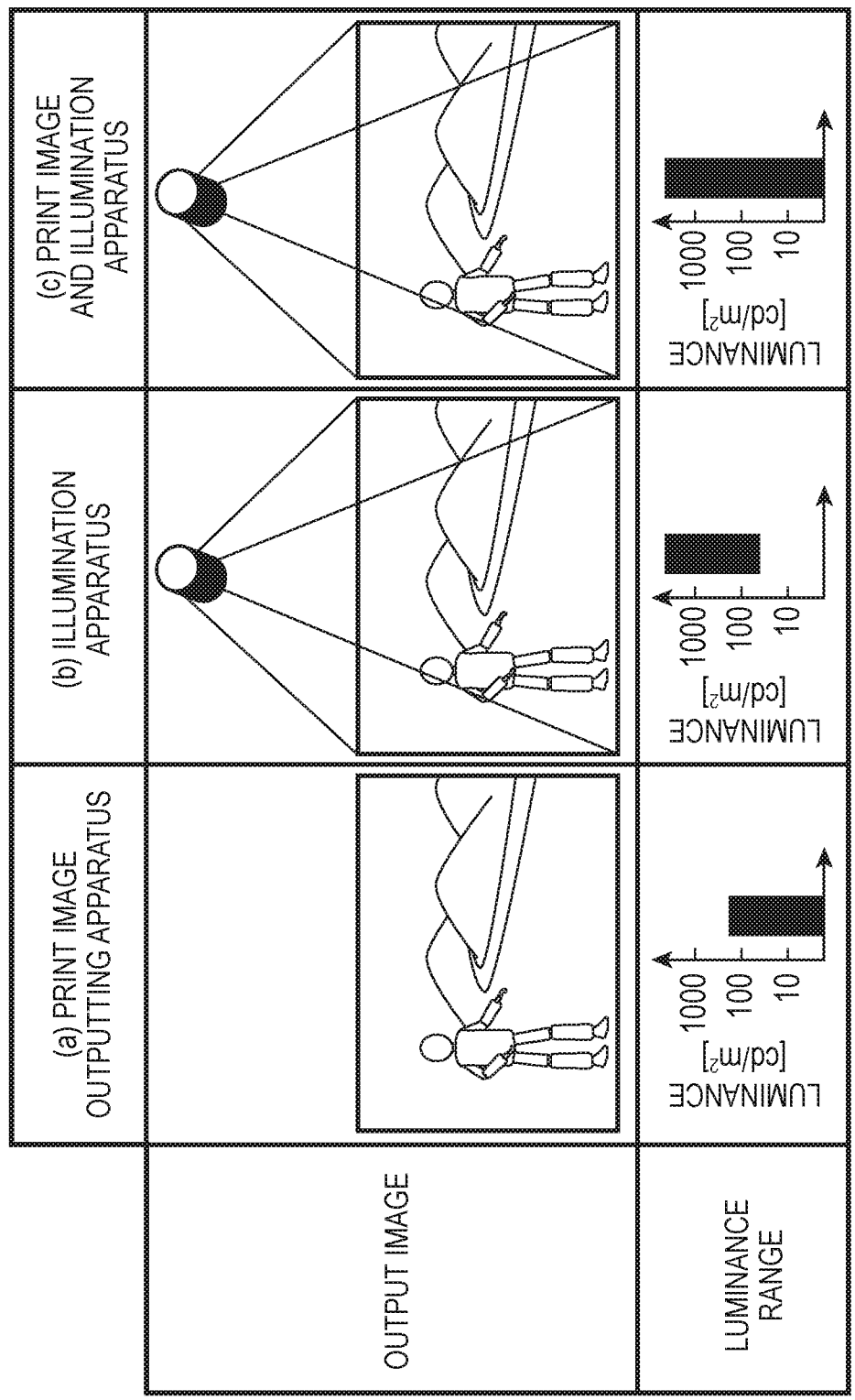
FIG. 20 is a diagram describing expansion of a luminance range of an output image.

Description regarding expansion of the luminance range of the output image by the image obtained through superimposition being output will be complemented using FIG. 20. FIG. 20 is a diagram illustrating relationship between an output image and a luminance range of the output image.

(a) in FIG. 20 is a diagram illustrating relationship between an output image output by the print image output apparatus 111 under typical illumination and a luminance range of the output image. As illustrated in (a) in FIG. 20, the output image output by the print image output apparatus 111 under typical illumination falls within a dark luminance range having maximum luminance of approximately 100 [$cd/m^2$].

Further, (b) in FIG. 20 is a diagram illustrating relationship between an output image output by the illuminating apparatus 113 under typical illumination and a luminance range of the output image. As illustrated in (b) in FIG. 20, the output image output by the illuminating apparatus 113 under typical illumination falls within a bright luminance range having maximum luminance of equal to or higher than 1000 [$cd/m^2$] and minimum luminance of approximately 100 [$cd/m^2$].

As described above, as illustrated in (a) and (b) in FIG. 20, the print image output apparatus 111 has an advantage in expression of a dark portion compared to the illuminating apparatus. On the other hand, the illuminating apparatus 113 has an advantage in expression of a bright portion.

Therefore, in the present embodiment, to improve expressivity of both a dark portion and a bright portion, the image data output at the print image output apparatus 111 is superimposed on the image data output at the illuminating apparatus 113 by utilizing characteristics of the apparatuses as described above. (c) in FIG. 20 is a diagram illustrating an image in which the image data in (a) in FIG. 20 is superimposed on the image data in (b) in FIG. 20. By superimposing the image data in this manner, it is possible to expand the luminance range of the output image while realizing expression of both a dark portion for which the print image output apparatus has an advantage, and a bright portion for which the illuminating apparatus has an advantage.

(Functional Configuration of Image Processing Apparatus)

Figure 3:
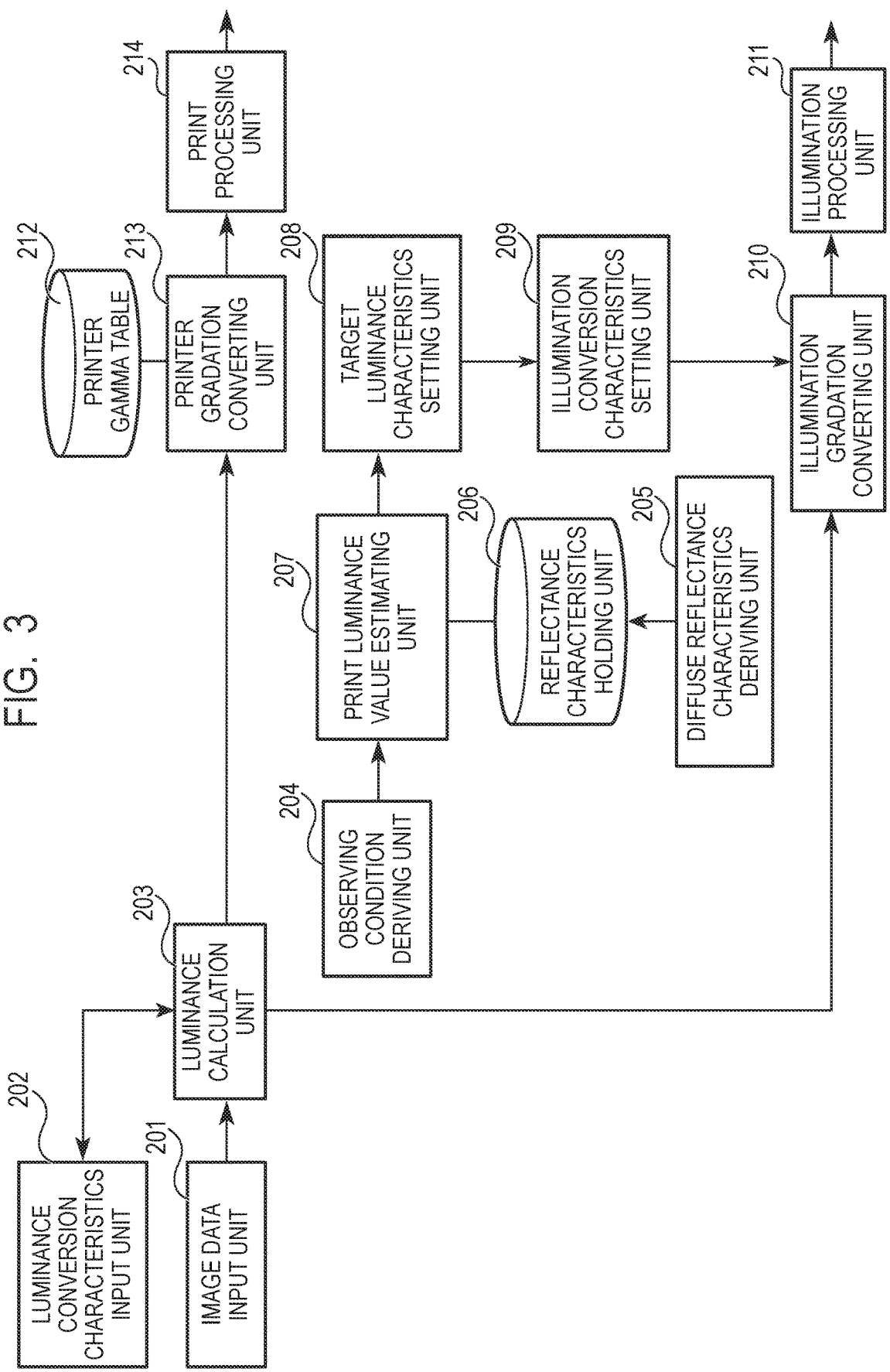
FIG. 3 is a functional block diagram of the image processing apparatus.

A functional configuration of the image processing apparatus 100 will be described next using FIG. 3. FIG. 3 is a functional block diagram of the image processing apparatus 100. Note that functions illustrated in FIG. 3 are realized by programs for realizing these functions being supplied to the image processing apparatus 100 illustrated in FIG. 2 and being executed by the image processing apparatus 100.

When an image data input unit 201 receives input of image data by an instruction from a user, the image data input unit 201 stores the input image data in a predetermined buffer allocated to the RAM 106, or the like. A luminance conversion characteristics input unit 202 receives (derives) characteristics for converting a pixel value of the image data input by the image data input unit 201 into a pixel value whose luminance is linear.

Note that it is also possible to use a lookup table for converting the input image data into image data (pixel value) whose luminance is linear as the luminance converting characteristics. Further, in the case where the input image data has a publicly known γ value with respect to luminance, holding a value obtained by performing inverse gamma conversion on the γ value should be sufficient. For example, it is assumed that the image data input to the image data input unit 201 is an sRGB image. In this case, because it is publicly known that the sRGB image is an image in which γ=0.45 being applied with respect to luminance, an inverse thereof of γ=2.2 may be input to the luminance conversion characteristics input unit 202 and held in the image processing apparatus 100. In either case, an image input to the image data input unit 201 may be input image data whose correspondence relationship with a luminance value of a subject is known.

A luminance calculation unit 203 converts the image data input to the image data input unit 201 into image data (pixel value) whose luminance is linear using the luminance converting characteristics input to the luminance conversion characteristics input unit 202. Here, the image data input to the image data input unit 201 may be image data whose correspondence relationship with the luminance value of the subject is known. Then, the luminance calculation unit 203 may convert the image data into image data which can be regarded as being substantially linear with respect to the luminance value based on the correspondence relationship. Note that, if the image data input to the image data input unit 201 can be regarded as being substantially linear with respect to the luminance value, the luminance conversion characteristics input unit 202 and the luminance calculation unit 203 are not essential components (functions).

The observing condition deriving unit 204 derives the observing condition set by the user using the GUI illustrated in FIG. 7 which will be described later. The diffuse reflectance characteristics deriving unit 205 derives diffuse reflectance characteristics of the image output by the print image output apparatus 111 by, for example, a colorimetry unit or a variable angle measuring unit. The reflectance characteristics holding unit 206 holds the diffuse reflectance characteristics (print reflectance characteristics) derived by the diffuse reflectance characteristics deriving unit 205.

Figure 4:
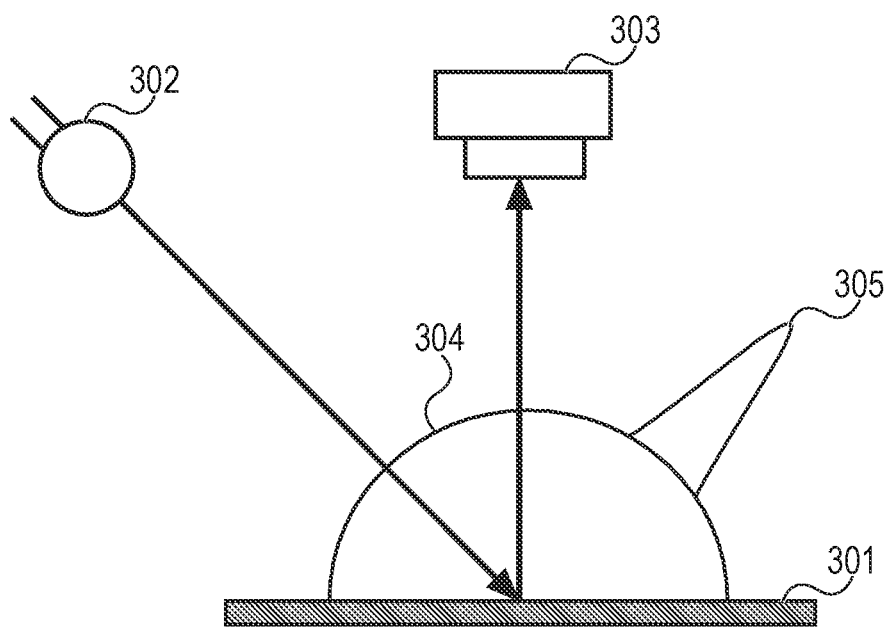
FIG. 4 is a diagram illustrating a spectral colorimetry unit used for measurement of diffuse reflectance characteristics.

Here, measurement of the diffuse reflectance characteristics by a typical spectral colorimetry unit will be described using FIG. 4. In measurement by the spectral colorimetry unit, as illustrated in FIG. 4, illumination light 302 is disposed in a direction of an incident angle of 45 degrees with respect to a print piece 301. Then, light radiated from the illumination light 302 and reflected at the print piece 301 is received by a light receiving unit 303 disposed in a direction of a reflection angle of 0 degree. By performing measurement in this manner, at the light receiving unit 303 of the spectral colorimetry unit, specular reflected light 305 according to the specular reflection characteristics of the print piece 301 is not measured, and only diffuse reflected light 304 of the print piece 301 is received (measured).

In the present embodiment, by converting gradation of an input RGB image (8 bits) whose luminance is linear and printing the image by the print image output apparatus 111, and, then, measuring light reflected from the printed (output) patch with the spectral colorimetry unit, the diffuse reflectance characteristics are derived. Note that conversion of gradation is, specifically, executed on an image (white ((R, G, B)=(255, 255, 255)) to black ((R, G, B)=(0, 0, 0))) whose luminance is linear by a printer gradation converting unit 213 using a printer gamma table 212.

Figure 18:
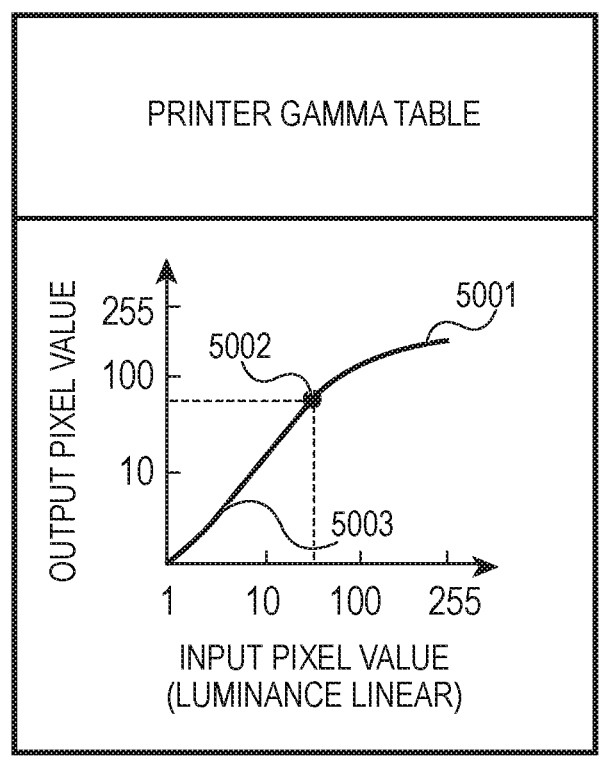
FIG. 18 is a diagram illustrating a printer gamma table.

Here, description regarding gradation conversion processing using the printer gamma table (printer gradation converting characteristics) 212 will be complemented. FIG. 18 is a diagram illustrating the printer gamma table 212. The printer gamma table 212 illustrated in FIG. 18 is set so that a preferable image is output at normal illumination intensity, that is, 300-1000 [lx]. Specifically, the printer gamma table 212 is set so that an image is formed in a state where linearity of the scene luminance and the printer luminance is maintained in a region where the luminance is equal to or less than the luminance range of the important region (5002) such as skin at normal illumination intensity. Therefore, as illustrated in FIG. 18, the printer gamma table 212 is set in a shape of a gamma curve (S-shape) which is conventionally considered preferable, which does not have linearity (linear relationship), that is, which is compressed at a highlight portion (5001) and a shadow portion (5003).

Then, as described above, diffuse reflectance characteristics are derived regarding the print piece output by performing print processing by the print processing unit 214 on the image data whose gradation is converted using such a printer gamma table 212. Note that the derived diffuse reflectance characteristics are stored in the reflectance characteristics holding unit 206 as print reflectance characteristics. Further, the reflectance characteristics holding unit 206 is, for example, allocated to the storage unit 103, or the like.

In the present embodiment, print reflectance characteristics obtained by dividing a portion from the brightest portion (that is, a white patch formed from the image data with maximum luminance) to the darkest portion (that is, a black patch formed from the image data with minimum luminance) of the input image data into five portions are derived. Specifically, by equally dividing the input RGB image whose luminance is linear into five portions on a gray line, and further, converting gradation by the printer gradation converting unit 213 using the printer gamma table 212, print reflectance characteristics regarding respective pieces of the image data are derived. That is, the print reflectance characteristics regarding respective pieces of the image data are derived by converting gradation of five patches of the input image (R, G, B)=(255, 255, 255) . . . (0, 0, 0) whose luminance is linear using the printer gamma table 212.

Note that the number of images (patches) for which the print reflectance characteristics are derived is not necessarily limited to this. Therefore, it is, for example, also possible to derive the print reflectance characteristics for all the RGB values (256×256×256≈16 millions) or for the RGB values (9×9×9=729) obtained by equally decimating the RGB values of 0-255 to nine.

The print reflectance characteristics held in the reflectance characteristics holding unit 206 will be described next using FIG. 5. FIG. 5 is a diagram illustrating the print reflectance characteristics held in the reflectance characteristics holding unit 206, and, more specifically, illustrates an example where CIEXYZ values of the diffuse reflectance characteristics corresponding to the input image whose luminance is linear are held as a table.

Note that, as additional information, while the input image is an image whose luminance is linear, because gradation is converted using the printer gamma table 212, the derived diffuse reflectance characteristics (print reflectance characteristics) do not have linear luminance. Further, it is also possible to use CIELAB values or only the luminance value Yin place of the CIEXYZ values.

Returning to FIG. 3, the print luminance value estimating unit 207 calculates (estimates) luminance of diffuse reflected light of the print piece in the observation environment from the illumination intensity derived by the observing condition deriving unit 204 and the print reflectance characteristics held in the reflectance characteristics holding unit 206. A target luminance characteristics setting unit 208 sets target luminance characteristics to be reproduced based on the print luminance estimated at the print luminance value estimating unit 207. Note that, as will be described later, in the case where chroma is used in place of luminance, the target luminance characteristics setting unit 208 sets target chromatic characteristics to be reproduced as a target chromatic characteristics setting unit.

The illumination converting characteristics setting unit 209 sets converting characteristics for converting the image data into image data to be output to the illuminating apparatus 113 based on a difference between the target luminance characteristics set at the target luminance characteristics setting unit 208 and the print luminance estimated at the print luminance value estimating unit 207.

The illumination gradation converting unit 210 converts gradation of the image data whose luminance is linear, output from the luminance calculation unit 203 using the converting characteristics set at the illumination converting characteristics setting unit 209.

The illumination processing unit 211 outputs image data for illumination after performing processing for the illuminating apparatus on the image converted at the illumination gradation converting unit 210. Note that, it is assumed in the present embodiment that the pixel value of the above-described image data for illumination and the illumination intensity (illuminance [lx]) of light radiated at the illuminating apparatus have linear (proportional) relationship. Further, illumination image data is supplied to the illuminating apparatus 113 via an illuminated image output unit 112, and radiation is executed by the illuminating apparatus 113.

As described above, the printer gradation converting unit 213 converts gradation of the image data whose luminance is linear using the printer gamma table 212. The print processing unit 214 outputs print image data after performing processing for print (for printing) on the image data converted by the printer gradation converting unit 213. Note that, it is assumed in the present embodiment that the pixel value of the above-described print image data and the luminance of the print piece have linear (proportional) relationship. Further, the print image data is supplied to the print image output apparatus 111 via the print image outputting unit 108, and image forming processing is executed.

(Print Processing Unit)

Figure 6:
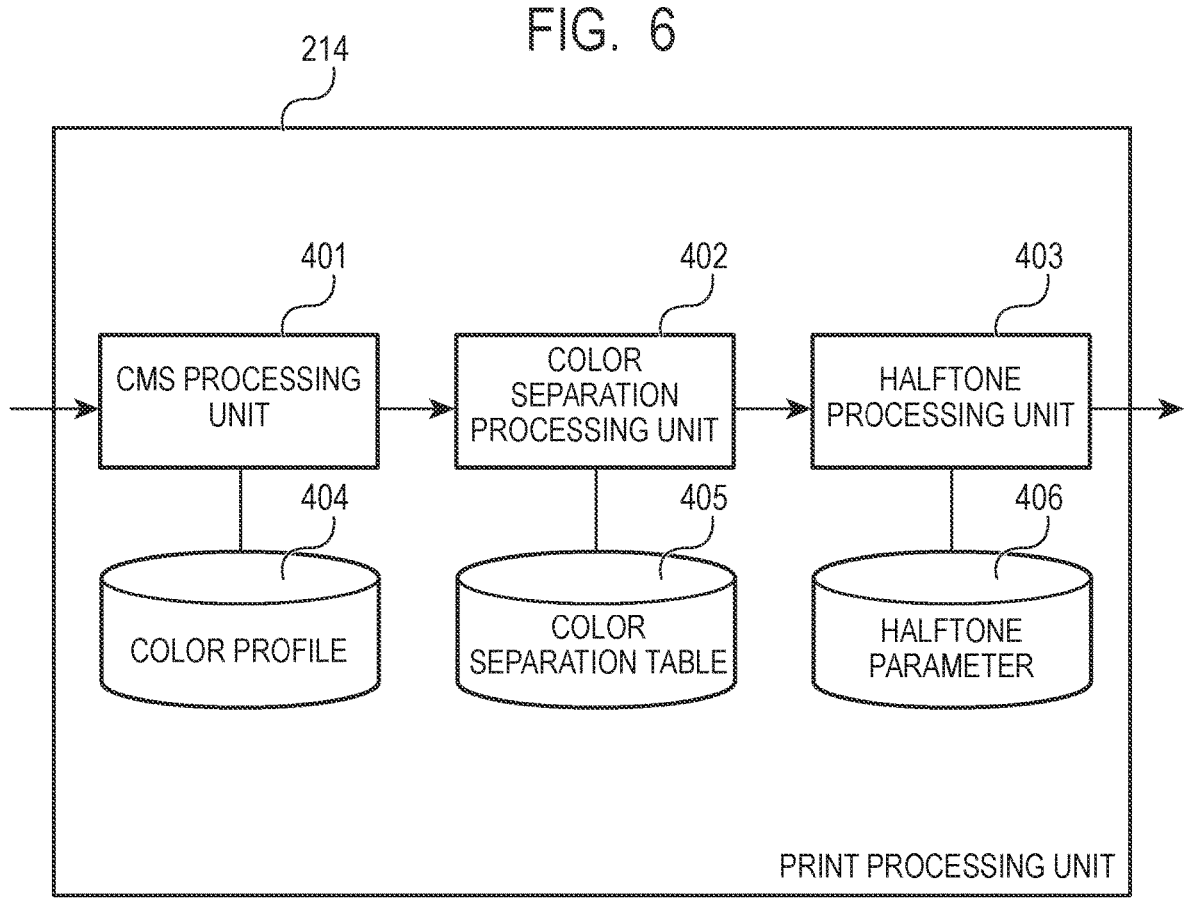
FIG. 6 is a functional block diagram of a print processing unit.

A functional configuration of the print processing unit 214 will be described next using FIG. 6. FIG. 6 is a functional block diagram of the print processing unit 214. The print processing unit 214 includes a CMS processing unit 401, a color separation processing unit 402, a halftone processing unit 403, color profile 404, a color separation table 405 and a halftone parameter 406 as functions thereof.

The CMS (Color Management System) processing unit 401 performs color matching processing on image data stored in a buffer with reference to the color profile 404 designed in advance. The color separation processing unit 402 separates color of the image data subjected to the color matching processing into recording materials mounted on the print image output apparatus 111 with reference to the color separation table 405 designed in advance. For example, in the case where six recording materials of CMYKLcLm are mounted on the print image output apparatus 111, color of the image data of RGB is separated into recording material data indicating amounts of the respective recording materials of CMYKLcLm.

The halftone processing unit 403 binarizes the color-separated recording material data through binarizing processing such as an error diffusion method and a dither method with reference to an error diffusion coefficient such as the halftone parameter 406 and a threshold matrix. Note that, in the case where the print image output apparatus 111 is an ink-jet printer, when halftone image data is input, the print image output apparatus 111 controls ejection of corresponding ink according to the respective recording materials data to form an image on a recording medium.

(Illumination Processing Unit)

Figure 19:
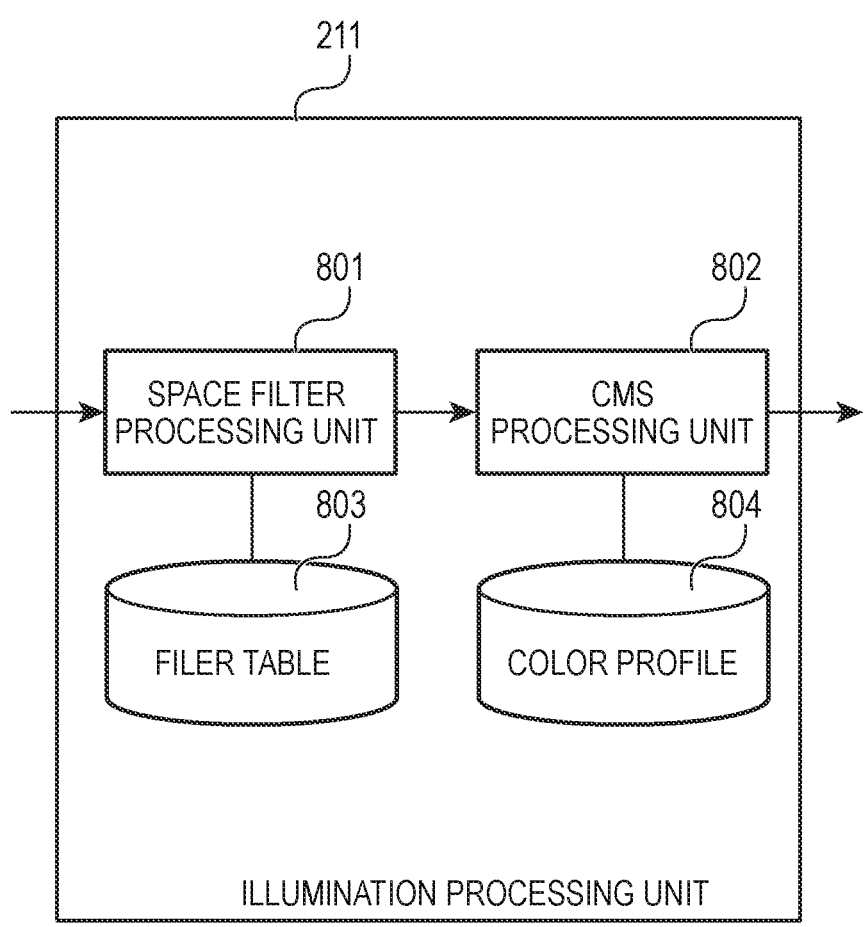
FIG. 19 is a functional block diagram of an illumination processing unit.

A functional configuration of the illumination processing unit 211 will be described next using FIG. 19. FIG. 19 is a functional block diagram of the illumination processing unit 211. A spatial filter processing unit 801 performs one of sharpness emphasis processing, sharpness recovery processing and noise reduction processing on the image data stored in the buffer with reference to the filter table 803 designed in advance.

A CMS processing unit 802 performs color matching processing on the image data stored in the buffer with reference to color profile 804 designed in advance. For example, in the case where the illuminating apparatus 113 is a projector, when the image data subjected to the color matching processing is input, the illuminating apparatus 113 radiates an image whose color is separated into RGB channels through corresponding color filter images, or the like, according to the image data.

(Observing Condition Deriving Unit)

A GUI provided by the observing condition deriving unit 204 will be described next using FIG. 7. The user sets the observing condition using the GUI illustrated in FIG. 7. In the GUI illustrated in FIG. 7, the user selects "select candidate" for intuitively inputting the illumination intensity on the print piece, or "numerical value setting" for inputting the illumination intensity with numerical values (physical values) through check boxes.

In the case where "select candidate" is selected, the illumination intensity is selected from, for example, very high (daytime outdoor), high (illumination in museum of art), normal (office), slightly dark (home), or the like, as candidates. Illuminance luxes corresponding to the candidates are set at the candidates to be selected as "select candidate", and, for example, if normal (office) is selected, the subsequent processing is executed assuming that 800 [lx] is selected. Further, in the case where "numerical value setting" is selected, the illumination intensity (value of illuminance lux [lx]) on the print piece is input in a text box or specific illumination intensity is selected by a slider bar being moved to right and left. In this manner, the illumination intensity of light to be radiated on the print piece is derived and set at the observing condition deriving unit 204.

Note that, while the illumination intensity can be locally controlled at the illuminating apparatus used in the present embodiment, here, the user is allowed to select illumination intensity upon radiation at maximum illumination intensity which can be radiated on the whole surface as the illumination intensity. For example, in the case where the illuminating apparatus 113 is a projector, illumination intensity in the case where white ((R, G, B)=(255, 255, 255)) is set for the whole surface as the image data is selected by the user. That is, if the illuminating apparatus 113 is a handy type apparatus or an apparatus which can be put into a pocket, even in the case where white ((R, G, B)=(255, 255, 255)) is set for the whole surface as the image data, only low illumination intensity of approximately 300 [lx] can be obtained. Meanwhile, if the illuminating apparatus 113 is an illuminating apparatus mounted in a meeting room or an art museum, in the case where white ((R, G, B)=(255, 255, 255)) is provided for the whole surface as the image data, it is possible to obtain high illumination intensity of approximately 3000 [lx]. In this manner, the maximum illumination intensity which can be obtained differs according to the illuminating apparatus 113 to be used.

Further, while, in the above-described embodiment, description has been provided using illuminance [lx] as the illumination intensity (luminance), luminance of illumination is not necessarily limited to this, and, for example, luminance [cd/m2], [nit] can be also used. In addition, to allow the user to input the illumination intensity more correctly, it is also possible to describe on the GUI that it is necessary to measure illuminance using an illuminance meter on a print piece to be posted.

(Image Processing)

Figure 8:
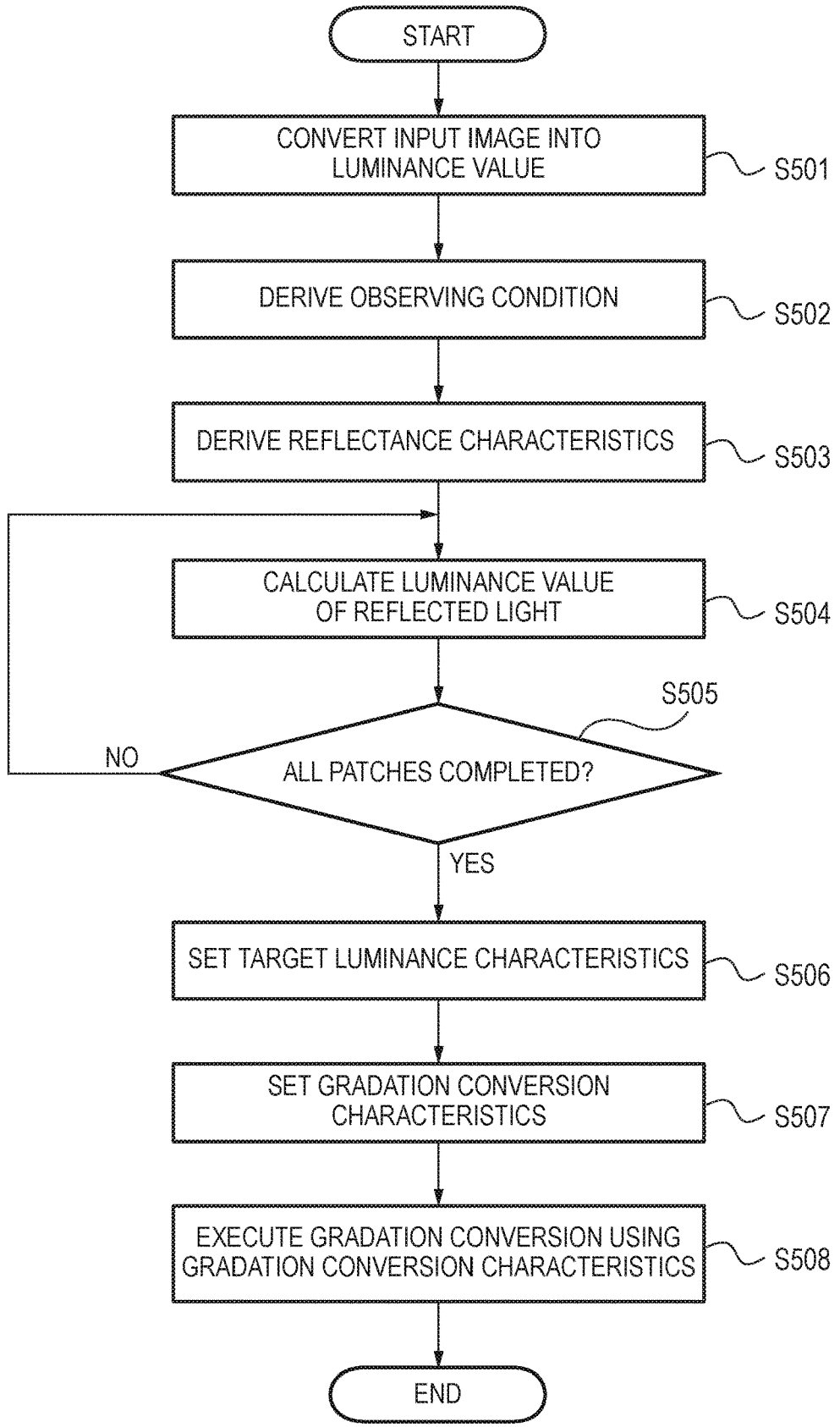
FIG. 8 is a flowchart illustrating procedure of image processing at the image processing apparatus.

Image processing at the image processing apparatus 100 will be described next using FIG. 8. FIG. 8 is a flowchart illustrating procedure of the image processing at the image processing apparatus 100. The luminance calculation unit 203 converts the image data input to the image data input unit 201 into image data whose luminance is linear using the luminance converting characteristics input to the luminance conversion characteristics input unit 202 (S501).

The observing condition deriving unit 204 derives the observing condition (illumination intensity Lt [lx]) selected by the user (S502). As described above, as the illumination intensity Lt described here, a value (illumination intensity) upon radiation at maximum illumination intensity which can be radiated at the illuminating apparatus 113 is derived. For example, in the case where the illuminating apparatus 113 is a projector, illumination intensity in the case where white ((R, G, B)=(255, 255, 255)) is set for the whole surface as the image data is derived.

When the observing condition is derived by the observing condition deriving unit 204 (S502), the print luminance value estimating unit 207 derives diffuse reflectance characteristics (Pd) from the reflectance characteristics holding unit 206 (S503). The print luminance value estimating unit 207 calculates luminance Cd of diffuse reflected light of the print piece based on the derived observing condition (illumination intensity Lt [lx]), and the diffuse reflectance characteristics (Pd) (S504).

Note that the luminance Cd of the diffuse reflected light of the print piece is calculated using the following equation.

$$Cd = PdY/100 \times Lt/\pi \ [cd/m2] \quad (1)$$

Here, $\pi$ indicates a circle ratio, and PdY indicates a Y component in tri stimulus values XYZ of the diffuse reflectance characteristics.

The print luminance value estimating unit 207 determines whether or not the luminance Cd of the diffuse reflected light is calculated for all the patches (S505). Then, if it is determined that calculation of the luminance Cd of the diffuse reflected light is not finished for all the patches (S505: No), the image processing apparatus 100 returns the processing to step S504, and calculates the luminance Cd of the diffuse reflected light for all the patches.

As described above, in the present embodiment, diffuse reflectance characteristics regarding respective pieces of the image data are derived by converting gradation of the input RGB image (whose luminance is linear) obtained by equally dividing the image on a gray line into five portions, by the printer gradation converting unit 213 using the printer gamma table 212. That is, by converting gradation of five patches of the input image (R, G, B)=(255, 255, 255) . . . (0, 0, 0) whose luminance is linear using the printer gamma table 212, print reflectance characteristics regarding respective pieces of the image data are derived.

When the luminance Cd of the diffuse reflected light of the print piece is calculated by the print luminance value estimating unit 207, the target luminance characteristics setting unit 208 sets (introduces) the target luminance characteristics to be reproduced as the print piece based on the calculated luminance Cd of the diffuse reflected light of the print piece (S506).

The target luminance characteristics are set such that, in the case where reproducing ranges of the print luminance characteristics are different, a tilt of output luminance in a linear region in the case where the reproducing range is relatively small matches a tilt of output luminance in a linear region in the case where the reproducing range is relatively large.

In the following description, if the reproducing range of the print luminance characteristics is considered as a difference between a maximum value of the print luminance and a minimum value of the print luminance, in the case where the illumination intensity [lx] becomes high, typically, the reproducing range of the print luminance characteristics becomes larger.

Here, for example, as illustrated in FIG. 5, it is assumed that light whose illumination intensity [lx] is different by ten times, for example, 300 and 3000 is radiated on a print piece whose print diffuse reflectance characteristics PdY falls within a range from 0.77 to 90.3. Then, the reproducing range of the print luminance characteristics is calculated using equation (1).

In the case where the illumination intensity is 300 [lx], the print luminance characteristics Cd becomes 0.7 to 86.3 [cd/m$^2$], and (maximum value of print luminance)−(minimum value of print luminance) becomes 85.6. Meanwhile, in the case where the illumination intensity is 3000 [lx], the print luminance characteristics Cd become 7.4 to 862 [cd/m$^2$], and (maximum value of print luminance)−(minimum value of print luminance) becomes 855. That is, as the illumination intensity [lx] becomes higher, the reproducing range of the print luminance characteristics becomes larger.

Note that the reproducing range of the print luminance characteristics can be roughly calculated from the maximum value of the print luminance, because the minimum value of the print luminance is sufficiently small for the maximum value of the print luminance, and, even if the reproducing range of the print luminance characteristics is calculated with the maximum value of the print luminance, a similar value can be often obtained.

In addition, in light of the above-described features, the target luminance characteristics are set such that, in the case where the reproducing ranges of the print luminance characteristics are different, the tilt of the output luminance in the linear region in the case where the reproducing range is relatively small matches the tilt of the output luminance in the linear region in the case where the reproducing range is relatively large.

Figure 9:
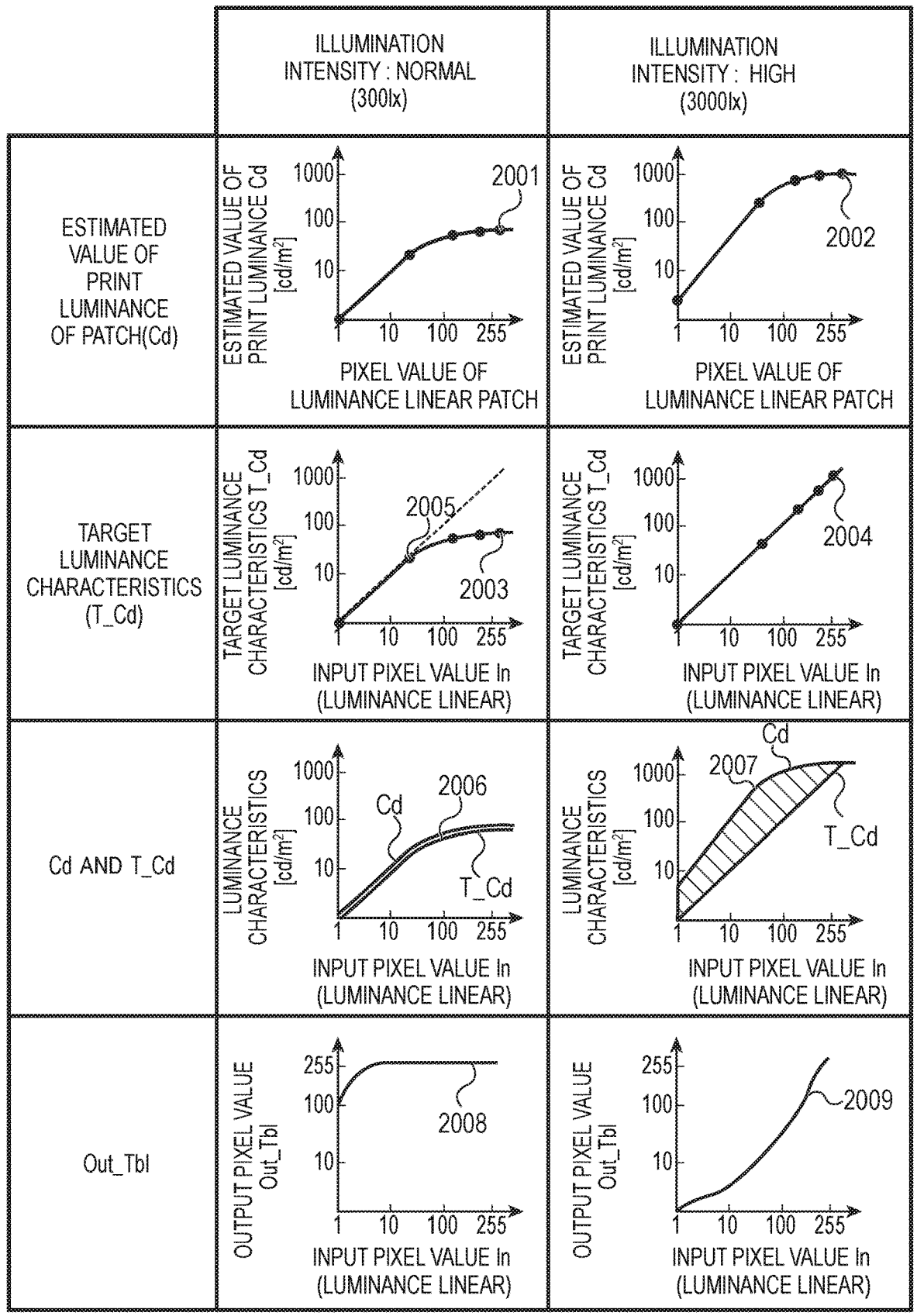
FIG. 9 is a diagram illustrating target luminance characteristics and converting characteristics.

Setting of the target luminance characteristics will be described next using FIG. 9. FIG. 9 illustrates a print luminance estimated value Cd of the patch estimated according to the illumination intensity and the target luminance characteristics T_Cd set based on the print luminance estimated value.

In FIG. 9, the print luminance estimated value Cd is calculated based on equation (1) from a Y value (PdY) of the diffuse reflectance characteristics and the illumination intensity Lt [lx]. Based on equation (1), in FIG. 9, in the case where the illumination intensity: normal (300 [lx]), a maximum value Cd_Max (2001) of the print luminance estimated value Cd of the patch becomes approximately 100 [cd/m$^2$]. Meanwhile, in the case where the illumination intensity: high (3000 [lx]), the maximum value Cd_Max (2002) of the print luminance estimated value Cd of the patch becomes approximately 1000 [cd/m$^2$].

Note that, as described above, the illuminating apparatus used in the case where the illumination intensity: normal (300 [lx]) is, for example, handy-type simple lighting. Meanwhile, the illuminating apparatus used in the case where the illumination intensity: high (3000 [lx]) is relatively large lighting.

The target luminance characteristics T_Cd in the case where the illumination intensity: normal (300 [lx]) have linear characteristics from a shadow portion to a halftone portion (in a region where the input pixel value is less than 64 (2005)). Further, converting characteristics of the target luminance characteristics T_Cd curve from the halftone portion to a highlight portion (in a region where the input pixel value is greater than 64 (2005)), and the target luminance characteristics T_Cd have non-linear characteristics (2003). Meanwhile, the target luminance characteristics T_Cd in the case where the illumination intensity: high (3000 [lx]) have linear characteristics from the shadow portion to the highlight portion (2004).

In this manner, the target luminance characteristics are set such that, in the case where the reproducing ranges of the print luminance characteristics are different, the tilt of the output luminance in the linear region in the case where the reproducing range is relatively small matches the tilt of the output luminance in the linear region in the case where the reproducing range is relatively large. Further, the target luminance characteristics are set such that as the estimated reproducing range of the print luminance characteristics becomes larger, the linear region increases.

In addition, while, in the above-described example, an example has been described where, in the case where the illumination intensity: high (3000 [lx]), the target luminance characteristics have linear characteristics from the shadow portion to the highlight portion, the target luminance characteristics are not necessarily limited to this. Therefore, for example, in the case where the illumination intensity is lower than 3000 [lx] (for example, 1000 [lx]), the target luminance characteristics may have linear characteristics from the shadow portion to the highlight portion. Further, inversely, in the case where the illumination intensity is higher than 3000 [lx] (for example, 5000 [lx]), the target luminance characteristics may have non-linear characteristics in the highlight portion (that is, a region where the input pixel value is greater than 128). In either case, the target luminance characteristics may be set such that, in the case where the reproducing ranges of the print luminance characteristics are different, the tilt of the target luminance characteristics in the linear region in the case where the reproducing range is relatively small matches the tilt of the target luminance characteristics in the linear region in the case where the reproducing range is relatively large.

As additional information, it is possible to distinguish between the linear region and the non-linear region from change of a feature amount such as a difference (differential) of previous and next pixel values. For example, a differential of the target luminance characteristics between the previous and next pixel values is sequentially calculated from the shadow portion (pixel value 0). Then, in the case where this differential between the previous and next pixel values is constant, the region is regard as linear. Further, in the case where the differential value $\Delta T$ is greater than a predetermined amount, or smaller than the predetermined amount, the region is regarded as non-linear. Therefore, for example, in the case where change $\Delta T$ of the differential value becomes equal to or greater than 3 or equal to or less than ⅓ in distinction between the linear region and the non-linear region, the region is determined as the non-linear region.

A method for setting the target luminance characteristics T_Cd at the target luminance characteristics setting unit 208 will be described next using FIG. 10. The target luminance characteristics T_Cd set at the target luminance characteristics setting unit 208 are calculated from two different tables (Tbl_1, Tbl_2) prepared in advance and a function of a weighting $\alpha$ value according to the maximum value Cd_Max [cd/m$^2$] of the print luminance estimated value Cd.

These two different tables are a Tbl_1 (3001) having non-linearity ($\Delta T$ is equal to or greater than 3 or equal to or less than ⅓), and a Tbl_2 (3002) having linearity from the shadow portion to the highlight portion, and are set so that the tilts of the output luminance in the linear regions become the same. Further, as the function, a function in which the weighting $\alpha$ value according to the maximum value Cd_Max [cd/m$^2$] of the print luminance estimated value Cd has linear relationship (3003) with Cd_Max is used. That is, the functions are set such that as the maximum value Cd_Max of the print luminance estimated value Cd becomes greater, the weighting $\alpha$ value becomes also greater.

In the above-described assumption, the target luminance characteristics T_Cd at the target luminance characteristics setting unit 208 are calculated using the following equation.

$$T\_Cd(In) = (1 - \alpha(Cd\_Max)) \times Tbl\_1(In) + \alpha(Cd\_Max) \times Tbl\_2(In) \quad (2)$$

Note that In is an input pixel value ($0 \leq In \leq 255$). Further, Tbl_1 (In) is a luminance value of Tbl_1 at the input pixel value In, and Tbl_2 (In) is a luminance value of Tbl_2 at the input pixel value In. Then, the target luminance characteristics T_Cd calculated using the above equation in the case where the weighting $\alpha$ value is made to fluctuate from $\alpha=0.00$ (3004), $\alpha=0.33$ (3005), $\alpha=0.66$ (3006), and $\alpha=1.00$ (3007), will be described in a lower part of FIG. 10.

Figure 10:
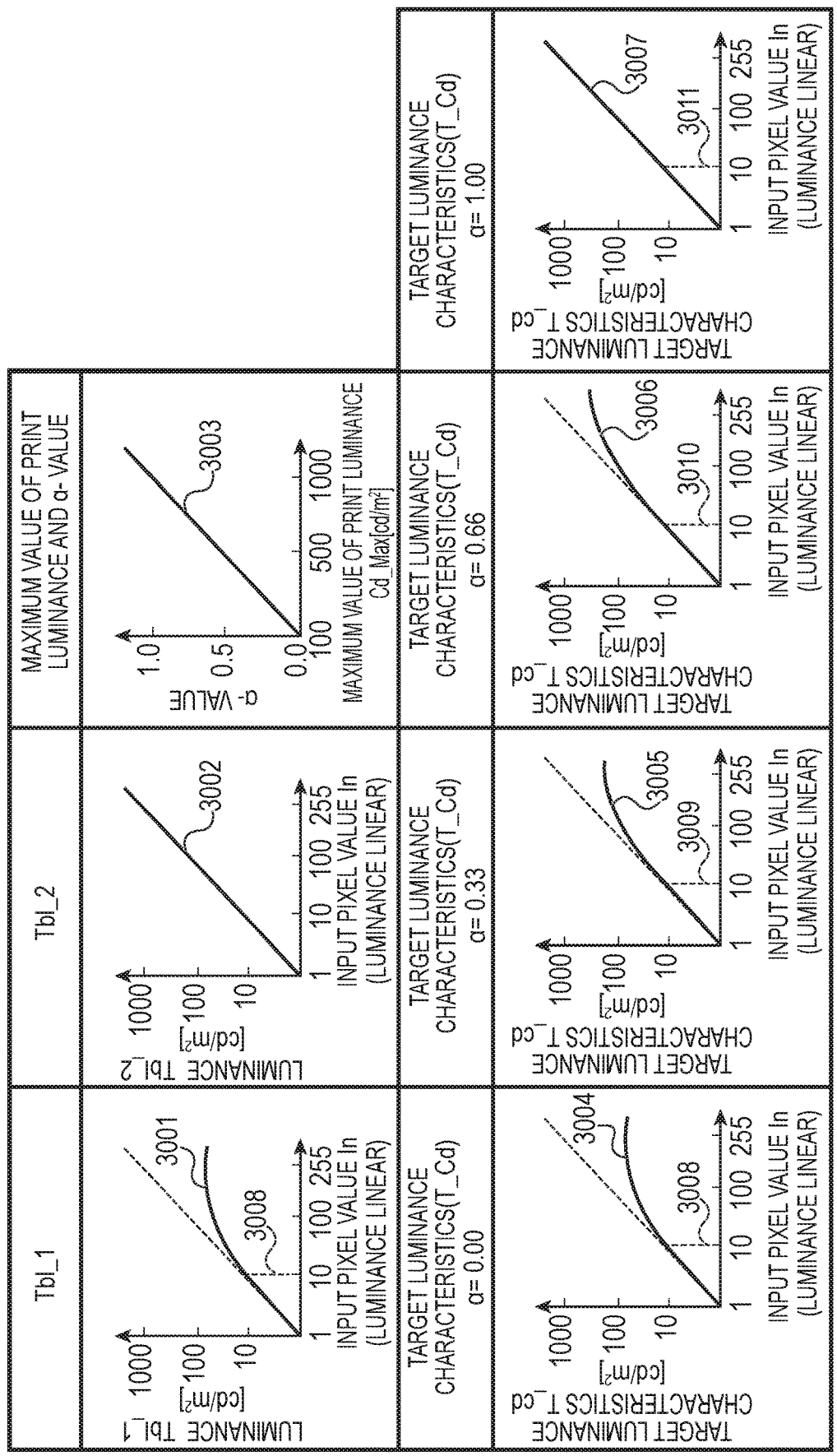
FIG. 10 is a diagram illustrating a method for setting the target luminance characteristics at a target luminance characteristics setting unit.

As illustrated in FIG. 10, even in the case where the α value fluctuates (even in the case where the reproducing range of the print luminance fluctuates), the tilts become the same in a region where the input pixel value In has linear relationship with the target luminance characteristics T_Cd. That is, the target luminance characteristics are set such that, in the case where the reproducing ranges of the print luminance characteristics are different, the tilt of the output luminance in the linear region in the case where the reproducing range is relatively small matches the tilt of the output luminance in the linear region in the case where the reproducing range is relatively large.

Note that FIG. 10 illustrates an example where the target luminance characteristics T_Cd are set such that, even in the case where the reproducing ranges of the print luminance characteristics are different, the tilts of the output luminance in the linear regions become the same using the two different tables. However, the above-described method is not necessarily limited concerning setting of the target luminance characteristics T_Cd, and, for example, the target luminance characteristics T_Cd may be defined using a spline function, and a curve of the spline function may be set so that the tilts of the output luminance in the linear regions become the same.

Here, returning to FIG. 8, the illumination converting characteristics setting unit 209 sets converting characteristics Out_Tbl using the print luminance estimated value Cd of the patch estimated at the print luminance value estimating unit 207 and the target luminance characteristics T_Cd set at the target luminance characteristics setting unit 208 (S507). The converting characteristics Out_Tbl are set such that the print luminance estimated value Cd becomes the target luminance characteristics T_Cd.

Here, referring to FIG. 9 again, the print luminance estimated value Cd and the target luminance characteristics T_Cd will be compared. FIG. 9 illustrates a graph 2006 which compares the print luminance estimated value Cd in the case where the illumination intensity: normal (300 [lx]) with tendency of the target luminance characteristics T_Cd. Further, FIG. 9 illustrates a graph 2007 which compares the print luminance estimated value Cd in the case where the illumination intensity: high (3000 [lx]) with the tendency of the target luminance characteristics T_Cd.

As indicated with reference numeral 2006 and reference numeral 2007 in FIG. 9, it can be understood that, in the case where the illumination intensity: normal (300 [lx]), the print luminance estimated value Cd substantially overlaps with the target luminance characteristics T_Cd. Meanwhile, it can be understood that, in the case where the illumination intensity: high (3000 [lx]), the target luminance characteristics T_Cd become smaller for the print luminance estimated value Cd.

Here, as expressed with the above equation (1), the print luminance estimated value Cd and the illumination intensity Lt [lx] have proportional relationship (that is, if the illumination intensity Lt is made half, the print luminance estimated value Cd also becomes half, and if the illumination intensity Lt is doubled, the print luminance estimated value Cd is also doubled).

Therefore, by setting the converting characteristics Out_Tbl based on a ratio of the print luminance estimated value Cd with respect to the target luminance characteristics T_Cd for each gradation in the graphs 2006 and 2007, it is possible to make the print luminance value approach the target luminance characteristics in all gradation.

Therefore, the converting characteristics Out_Tbl is set with the following equation. Note that In is an input pixel value (0≤In ≤255), T_Cd (In) is target luminance characteristics at the input pixel value In, and Cd(In) is a print luminance estimated value at the input pixel value In.

$$\mathrm{Out\_}Tbl(\mathrm{In})=T\_Cd(\mathrm{In})/Cd(\mathrm{In})\times\mathrm{In} \quad (3)$$

The converting characteristics Out_Tbl in the case where the illumination intensity: normal (300 [lx]) is indicated as 2008 in FIG. 9, and the converting characteristics Out_Tbl in the case where the illumination intensity: high (3000 [lx]) is indicated as 2009 in FIG. 9. Concerning the illumination intensity: normal (300 [lx]), it can be understood from 2008 in FIG. 9 that the illumination image data set at the illumination processing unit 211 becomes (R, G, B)=(255, 255, 255) except small values in part of the input image data. Meanwhile, concerning the illumination intensity: high (3000 [lx]), it can be understood from 2009 in FIG. 9 that the illumination image data set at the illumination processing unit 211 becomes smaller than that in the case where the illumination intensity: normal (300 [lx]) according to the input image data.

Here, returning to FIG. 8, the illumination gradation converting unit 210 converts gradation of the image data calculated at the luminance calculation unit 203 using the converting characteristics Out_Tbl set by the illumination converting characteristics setting unit 209 and outputs the image data whose gradation is converted to the illumination processing unit 211 (S508). By this means, the image processing illustrated in FIG. 8 is finished.

As described above, in the present embodiment, the illuminating apparatus which can locally control the illumination intensity is used as lighting. Then, the maximum illumination intensity of the illuminating apparatus and the print diffuse reflectance characteristics measured in advance are used to estimate print luminance perceived by an observer. In addition, image data for locally controlling illumination of the illuminating apparatus is changed so that, in the case where the reproducing ranges of the estimated print luminance characteristics are different, the tilts of the output luminance in the linear regions become the same.

Note that, in the above-described embodiment, the converting characteristics of the luminance are set such that the tilts of the output luminance in the linear regions become the same based on the estimated print luminance characteristics. However, chroma of the print may be estimated from the tristimulus values PdX, PdY and PdZ of the diffuse reflectance characteristics illustrated in FIG. 5. Then, the converting characteristics may be set such that, in the case where the reproducing ranges of the estimated print chromatic characteristics are different, the tilts of the output chroma in the linear regions become the same.

Embodiment 2

In the above-described Embodiment 1, the converting characteristics of the luminance are set such that, in the case where the reproducing ranges of the estimated print luminance characteristics are different, the tilts of the output luminance in the linear regions become the same. Further, the converting characteristics are set to be the target luminance characteristics T_Cd (FIG. 10) calculated based on synthesis (equation (2)) of two tables having different print luminance estimated values Cd.

However, in the target luminance characteristics set using the above-described method, regions (non-linear regions) where the output luminance characteristics become a curve from a straight line are the same even in the case where the reproducing ranges of the print luminance characteristics are different. Specifically, for example, in the output luminance characteristics of Tbl_1 (3001) illustrated in FIG. 10, the output luminance characteristics become a curve from a straight line around the input pixel value In of 10 and the output luminance Tbl_1 of 20 [cd/m$^2$] (3008). Further, these regions where the output luminance characteristics become a curve from a straight line are the same even in the case where the reproducing ranges of the print luminance characteristics are different (3008-3011). That is, linear regions of the output luminance characteristics are the same.

However, in the case where the reproducing ranges of the print luminance characteristics are different, the linear regions of the output luminance characteristics do not have to be the same. The output luminance information corresponding to the input information should rather be able to be expressed more correctly by increasing the linear region of the output luminance characteristics as the reproducing range of the print luminance becomes larger.

Therefore, in the present embodiment, the converting characteristics of the output luminance are set such that, in the case where the reproducing ranges of the print luminance characteristics are different, the linear region of the output luminance becomes larger in the case where the reproducing range becomes relatively larger. Note that, in the present embodiment, because processing other than processing in step S506 in the flowchart illustrated in FIG. 8 is similar to that in Embodiment 1, description thereof will be omitted here.

In Embodiment 1, in step S506, the target luminance characteristics to be reproduced as the print piece are set based on the luminance Cd of the diffuse reflected light of the print piece calculated by the print luminance value estimating unit 207. In the present embodiment, two or more types of target luminance characteristics T_Cd whose sizes of the linear regions of the output luminance are different are prepared, and the target luminance characteristics T_Cd are switched according to the maximum value Cd_Max of the print luminance estimated value Cd. Specifically, for example, four types of target luminance characteristics T_Cd whose sizes of the linear regions of the output luminance are different are prepared as illustrated in FIG. 16, and the target luminance characteristics T_Cd are switched according to the maximum value Cd_Max of the print luminance estimated value Cd.

Figure 16:
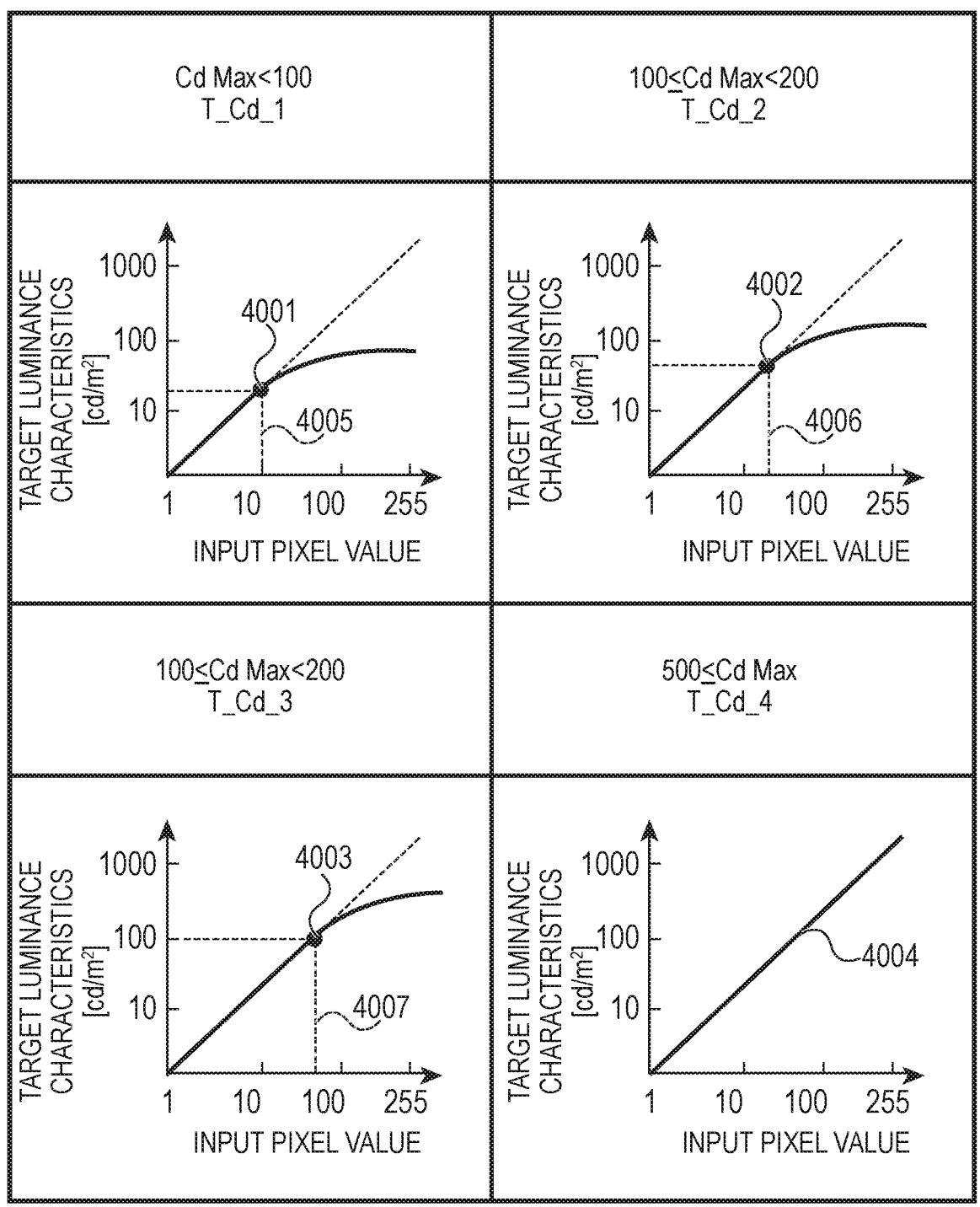
FIG. 16 is a diagram illustrating target luminance characteristics corresponding to a print luminance maximum value.

FIG. 16 illustrates the target luminance characteristics T_Cd corresponding to the print luminance maximum value, and, in FIG. 16, for example, in the case where the print luminance maximum value [Cd_Max<100], T_Cd_1 (4001) is allocated as the target luminance characteristics. In a similar manner, in the case where "100≤Cd_Max<200", T_Cd_2 (4002) is allocated, in the case where "200≤Cd_Max<500", T_Cd_3 (4003) is allocated, and in the case where "500≤Cd_Max", T_Cd_4 (4004) is allocated.

In FIG. 16, as can be seen from 4005 to 4007 in FIG. 16, the target luminance characteristics T_Cd are set such that the linear region of the output luminance becomes larger as the reproducing range of the print luminance characteristics is larger.

Note that, in FIG. 16, the converting characteristics of the luminance are set such that the linear region of the output luminance becomes larger based on the estimated print luminance characteristics. However, converting characteristics of chroma may be set such that the linear region of the output chroma becomes larger based on the estimated print chromatic characteristics.

As described above, in the present embodiment, the converting characteristics of the output luminance are set such that, in the case where the reproducing ranges of the print luminance characteristics are different, the linear region of the output luminance becomes larger in the case where the reproducing range becomes relatively large. By this means, even in the case where the reproducing ranges of the print luminance are different, it is possible to express output luminance information corresponding to the input information more correctly.

Embodiment 3

In the above-described Embodiments 1 and 2, examples have been described where the converting characteristics of the image data for locally controlling illumination at the illuminating apparatus are set such that the "tilts of the output luminance in the linear regions become the same" according to the reproducing range of the print luminance (chroma) estimated from the illumination intensity. Further, at the same time, examples have been described where the converting characteristics of the image data for locally controlling illumination at the illuminating apparatus are set such that the "linear region with respect to the luminance (chroma) of the input image increases" according to the reproducing range of the print luminance (chroma) estimated from the illumination intensity.

Figure 11:
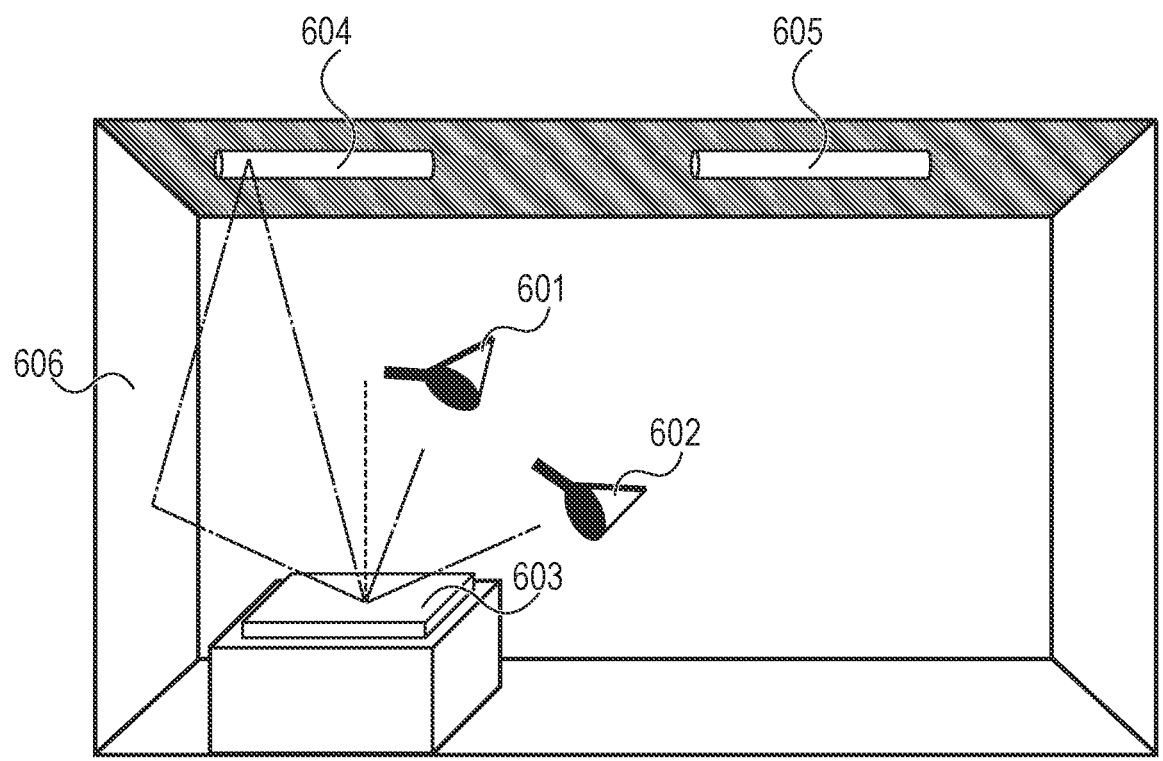
FIG. 11 is a diagram describing reflected light received at eyes of an observer from a print piece disposed in a typical observation environment.

However, there is a case where the print luminance cannot be estimated only from the illumination intensity. A case where the print luminance cannot be estimated only from the illumination intensity will be described below using FIG. 11. FIG. 11 is a diagram illustrating a state where light reflected from a print piece disposed in a typical observation environment is received at eyes of an observer.

In FIG. 11, an observation position 601 corresponds to a normal reflection direction of lighting 604, and at the observation position 601, light in an illumination image of a print piece 603 (specular reflected light) reaches the eyes of the observer. Here, if intensity of the specular reflected light is too high, because the observer cannot recognize color of the print piece 603, the observer moves from the observation position 601 to an observation position 602 where the specular reflected light does not enter the eyes, and observes the print piece 603.

However, referring to FIG. 11, there exists a wall 606 in the normal reflection direction corresponding to positional relationship between the observation position 602 and the print piece 603. Therefore, light of the lighting 604 is reflected at the wall 606 and reaches the print piece 603, and further, is received at the eyes of the observer as specular reflected light according to the specular reflection characteristics of the print piece 603, and is recognized by the observer as print luminance.

While this reflected light from the wall 606 is weaker than light which directly reaches the print piece 603 from the lighting 604, the reflected light does not have intensity to inhibit recognition of color of the print piece 603 at the observation position 602. Further, if light from various directions other than the normal reflection direction, for example, light from lighting 605 also reaches the print piece 603, the light is received at the eyes of the observer as diffuse reflected light according to the diffuse reflectance characteristics of the print piece 603 and is recognized as print luminance.

In this manner, the eyes of the observer receive the print luminance which is luminance in an incident angle direction facing the positional relationship between the observation position and the print piece, being reflected according to the specular reflection characteristics of the print piece 603, and print luminance which is light from directions other than the incident angle direction being reflected according to the diffuse reflectance characteristics of the print piece 603. That is, the eyes of the observer receive the print luminance based on diffuse reflectance and the print luminance based on specular reflection.

Here, in the above-described Embodiment 1, only the print luminance based on diffuse reflectance of light (illumination intensity) from directions other than the incident angle direction facing the positional relationship between the observation position and the print piece (sample) is taken into account. That is, in Embodiment 1, print luminance based on specular reflection of luminance (brightness of a ceiling and a wall) in the incident angle direction facing the positional relationship between the observation position and the print piece is not taken into account.

Therefore, in the present embodiment, estimation of print luminance based on luminance in the incident angle direction (hereinafter, luminance in the incident angle direction) facing the positional relationship between the observation position and the print piece (sample) will be additionally studied. The converting characteristics of the image data for locally controlling illumination at the illuminating apparatus are set such that the "tilts of the output luminance in the linear regions become the same" and the "linear region with respect to the luminance of the input image increases" according to the reproducing range of the estimated print luminance.

(Functional Configuration of Image Processing Apparatus)

Figure 12:
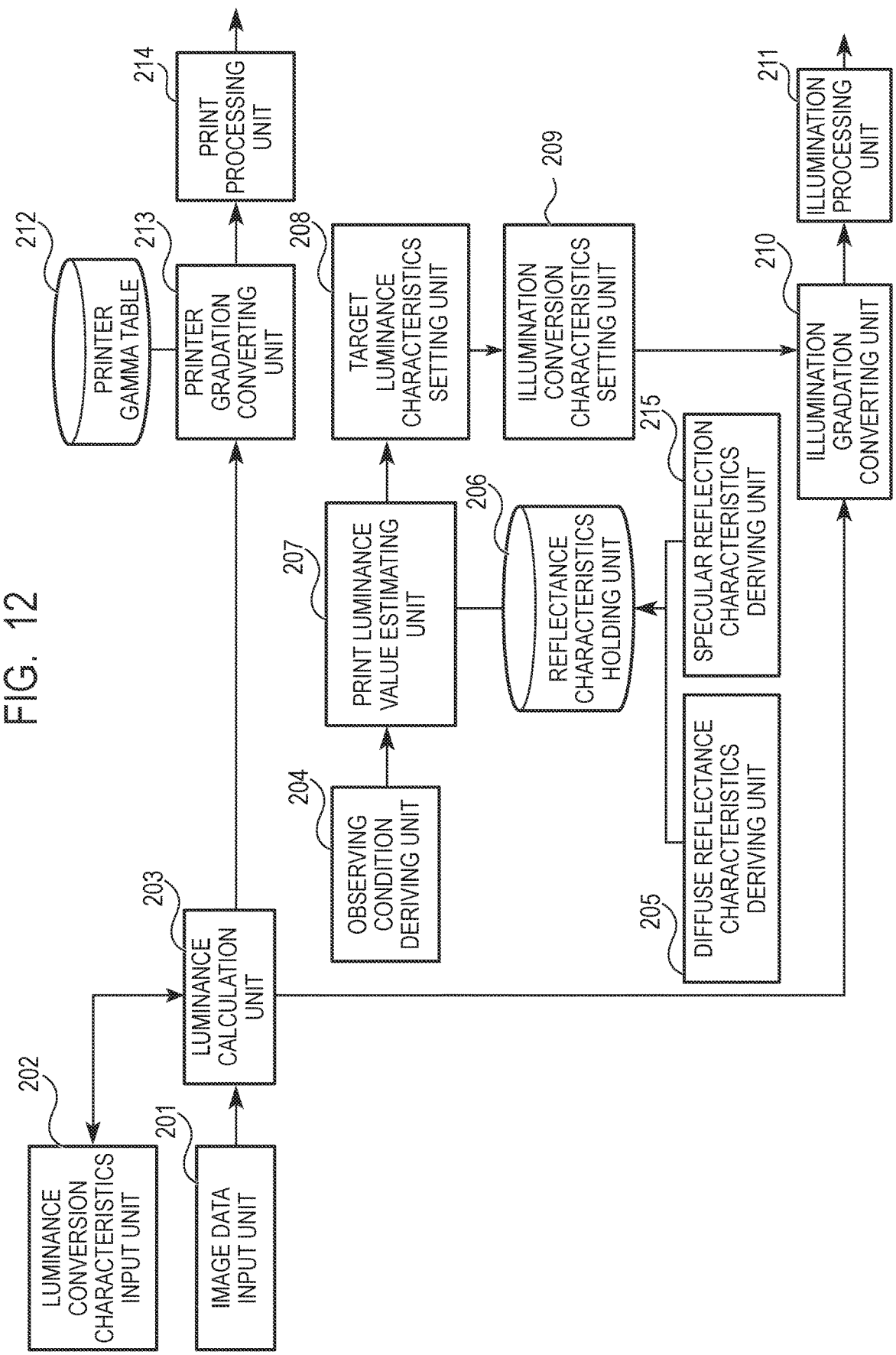
FIG. 12 is a functional block diagram of the image processing apparatus.

A functional configuration of the image processing apparatus 100 will be described next using FIG. 12. FIG. 12 is a functional block diagram of the image processing apparatus 100. Note that functions illustrated in FIG. 12 are realized by programs for realizing these functions being supplied to the image processing apparatus 100 illustrated in FIG. 2 and, further, being executed by the image processing apparatus 100. Note that, because functions of the components other than the observing condition deriving unit 204, the diffuse reflectance characteristics deriving unit 205, the reflectance characteristics holding unit 206, the print luminance value estimating unit 207, the specular reflection characteristics deriving unit 215 are similar to those in the image processing apparatus 100 in Embodiment 1, description will be omitted here.

The observing condition deriving unit 204 derives the observing condition set by the user using the GUI illustrated in FIG. 15 which will be described later. The diffuse reflectance characteristics deriving unit 205 derives diffuse reflectance characteristics of the image output by the print image output apparatus 111 with, for example, a colorimetry unit. The reflectance characteristics holding unit 206 holds the diffuse reflectance characteristics derived by the diffuse reflectance characteristics deriving unit 205 and the specular reflection characteristics derived by the specular reflection characteristics deriving unit 215 as print reflectance characteristics. The print luminance value estimating unit 207 calculates (estimates) luminance of the diffuse reflected light and the specular reflected light of the print piece in the observation environment from the illumination intensity derived by the observing condition deriving unit 204, luminance in the incident angle direction (brightness of a ceiling and a wall), and the print reflectance characteristics held by the reflectance characteristics holding unit 206. The specular reflection characteristics deriving unit 215 derives specular reflection characteristics of the image output by the print image output apparatus 111 using, for example, a variable angle measuring unit.

Figure 13A:
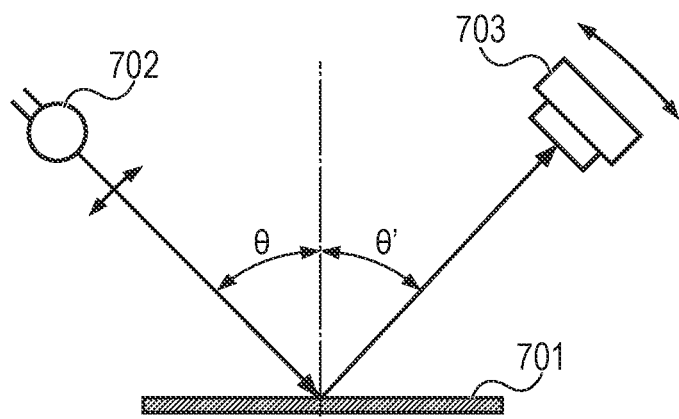
FIG. 13A and FIG. 13B are diagrams illustrating a variable angle measuring unit used for measurement of specular reflection characteristics.
Figure 13B:
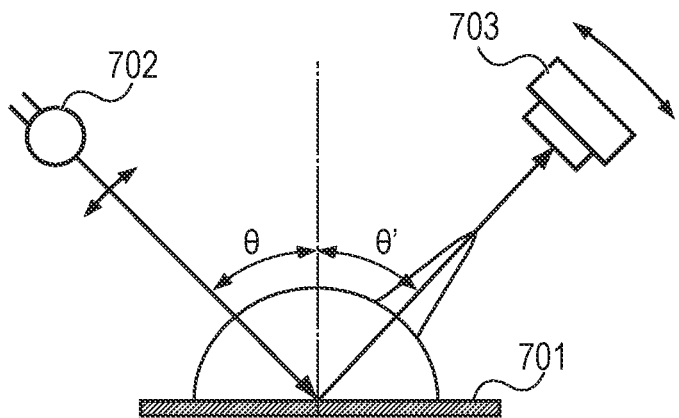

Note that the specular reflection characteristics are measured using a typical variable angle measuring unit illustrated in FIG. 13A and FIG. 13B. Here, the variable angle measuring unit is a device for measuring variable angle characteristics (bidirectional reflectance distribution function: BRDF). Further, the converting characteristics are obtained by measuring intensity of reflected light for an emitting angle (reflection angle) when light is radiated from a certain angle.

As illustrated in FIG. 13A, variable angle characteristics are measured by radiating light on a print piece 701 from illumination light 702 disposed at a position of projection angle θ and receiving light at reflection intensity of the print piece 701 at a light receiving unit 703 disposed at a position of a receiving angle θ'. Note that, in measurement of variable angle characteristics, by making the projection angle θ and the receiving angle θ' variable, it is possible to measure reflection intensity in all directions.

Further, FIG. 13B illustrates a measurement example of the variable angle characteristics in the case where typical gloss paper is used as the print piece 701. In FIG. 13B, for example, reflection intensity is measured by fixing the projection angle θ at 45 degrees and changing the receiving angle θ' from −90 degrees to +90 degrees. In FIG. 13B, light radiated from the illumination light 702 is reflected at the print piece 701, and exhibits large reflectance characteristics in a normal reflection direction (hereinafter, specular reflection characteristics). Meanwhile, the print piece 701 exhibits small reflectance characteristics in directions other than the normal reflection direction (hereinafter, diffuse reflectance characteristics).

In the present embodiment, the diffuse reflectance characteristics and the specular reflection characteristics are derived by converting gradation of the input RGB image (eight bits) whose luminance is linear and printing the image by the print image output apparatus 111, and measuring light reflected from the printed patch with a spectral colorimetry unit and a variable angle measuring unit.

Note that gradation conversion is, specifically, executed on the image (white ((R, G, B)=(255, 255, 255)) to black ((R, G, B)=(0, 0, 0))) whose luminance is linear by the printer gradation converting unit 213 using the printer gamma table 212.

Here, description regarding gradation conversion processing using the printer gamma table 212 will be complemented. FIG. 18 is a diagram illustrating the printer gamma table 212 as described in Embodiment 1, and the printer gamma table 212 is set so that a preferable image is output at normal illumination intensity (300-1000 [lx]).

Then, as described above, concerning a print piece output by performing print processing on the image data whose gradation is converted using such a printer gamma table 212, by the print processing unit 214, the diffuse reflectance characteristics and the specular reflection characteristics are derived. Note that the derived diffuse reflectance characteristics and specular reflection characteristics are stored in the reflectance characteristics holding unit 206 as print reflectance characteristics. Further, the reflectance characteristics holding unit 206 is, for example, allocated to the storage unit 103, or the like.

In the present embodiment, the print reflectance characteristics (the diffuse reflectance characteristics and the specular reflection characteristics) of equally divided five portions from a brightest portion (that is, a white patch formed from image data with maximum luminance) to a darkest portion (that is, a black patch formed from image data with minimum luminance) of the input image data, are derived.

Specifically, the print reflectance characteristics regarding respective pieces of the image data are derived by equally dividing the input RGB image whose luminance is linear into five portions on a gray line, and further, converting gradation by the printer gradation converting unit 213 using the printer gamma table 212. That is, the print reflectance characteristics regarding respective pieces of the image data are derived by converting gradation of five patches of the input image (R, G, B)=(255, 255, 255) . . . (0, 0, 0) whose luminance is linear using the printer gamma table 212.

Note that the number of images (patches) for which the print reflectance characteristics are derived is not necessarily limited to this. Therefore, for example, the print reflectance characteristics can be also derived for all the RGB values (256×256×256≈16 millions) or for RGB values (9×9×9=729) obtained by equally decimating the RGB values of 0 to 255 into nine values.

The print reflectance characteristics (the diffuse reflectance characteristics and the specular reflection characteristics) held in the reflectance characteristics holding unit 206 will be described next using FIG. 14. FIG. 14 is a diagram illustrating the print reflectance characteristics held in the reflectance characteristics holding unit 206, and, more specifically, illustrates an example where CIEXYZ values of the diffuse reflectance characteristics and the specular reflection characteristics corresponding to the input image whose luminance is linear are held as a table.

Note that, as additional information, while the input image is an image whose luminance is linear, because gradation is converted using the printer gamma table 212, the derived diffuse reflectance characteristics and specular reflection characteristics do not have linear luminance. Further, in place of the CIEXYZ values, it is also possible to use CIELAB values or only a luminance value Y.

In addition, the number of the CIEXYZ values of the diffuse reflectance characteristics (diffuse reflectance) to be prepared does not have to be the same as the number of the CIEXYZ values of the specular reflection characteristics (specular reflectivity) to be prepared. Specifically, because measurement of the specular reflection characteristics takes more trouble than measurement of the diffuse reflectance characteristics, as illustrated in FIG. 17, the number of the specular reflection characteristics may be made smaller than the number of the diffuse reflectance characteristics.

(Observing Condition Deriving Unit)

The GUI provided by the observing condition deriving unit 204 will be described next using FIG. 15. The user sets the observing condition using the GUI illustrated in FIG. 15. The user selects "select candidate" for intuitively inputting the illumination intensity on the print piece and the luminance in the incident angle direction, or "numerical value setting" for inputting the illumination intensity and the luminance in the incident angle direction with numerical values (physical values) through check boxes on the GUI illustrated in FIG. 14.

In the case where "select candidate" is selected, as a candidate for the illumination intensity, illumination intensity is selected from, for example, very high (daytime outdoor), high (illumination in museum of art), normal (office), slightly dark (home), or the like. In addition as a candidate for the luminance in the incident angle direction, luminance in the incident angle direction is selected from, for example, very bright (white), bright (light gray), normal (gray), dark (black), or the like. At a candidate selected as the "select candidate", illuminance lux corresponding to the candidate and luminance in the incident angle direction (brightness of a ceiling and a wall) are set. For example, the subsequent processing is executed assuming that 800 [lx] is selected if normal (office) is selected for the illuminance lux, or assuming that 50 [cd/m$^2$] is selected if normal (gray) is selected for the luminance in the incident angle direction (brightness of a ceiling and a wall).

Further, in the case where "numerical value setting" is selected, concerning the illumination intensity, the illumination intensity on the print piece (a value of illuminance lux (Lx)) is input in a text box or specific illumination intensity is selected by a slider bar being moved to right and left. In addition, also concerning the luminance in the incident angle direction, a value of luminance [cd/m$^2$] of a ceiling and a wall, which comes from an observing surface, is input in a text box or specific luminance in the incident angle direction is selected by a slider bar being moved to right and left. As described above, the illumination intensity of light radiated on the print piece and the luminance (brightness of a ceiling and a wall) in the incident angle direction can be derived and set at the observing condition deriving unit 204.

Note that, while, at the illuminating apparatus used in the present embodiment, the illumination intensity can be locally controlled, the user is allowed to select the illumination intensity upon radiation at maximum illumination intensity which can be radiated on the whole surface as the illumination intensity here. For example, in the case where the illuminating apparatus 113 is a projector, illumination intensity in the case where white ((R, G, B)=(255, 255, 255)) is set for the whole surface as the image data is selected by the user. That is, if the illuminating apparatus 113 is a handy type apparatus or an apparatus which can be put into a pocket, even in the case where white ((R, G, B)=(255, 255, 255)) is set for the whole surface as the image data, only low illumination intensity of approximately 300 [lx] can be obtained. Meanwhile, if the illuminating apparatus 113 is an illuminating apparatus mounted at a meeting room or an art museum, in the case where white ((R, G, B)=(255, 255, 255)) on the whole surface is provided as the image data, high illumination intensity of approximately 3000 [lx] can be obtained. In this manner, the maximum illumination intensity which can be obtained differs according to the illuminating apparatus 113 to be used.

Further, while, in the above-described embodiment, description has been provided using illuminance [lx] as the illumination intensity (luminance), the illumination luminance is not necessarily limited to this, and, for example, luminance [cd/m$^2$], [nit] can be also used. In addition, to allow the user to input the illumination intensity more correctly, it is also possible to describe on the GUI that it is necessary to measure illuminance using an illuminance meter on a print piece to be posted or measure luminance (brightness of a ceiling and a wall) in the incident angle direction facing the positional relationship between the observation position and the print piece.

(Image Processing)

Image processing at the image processing apparatus 100 will be described next using FIG. 8. As described above, FIG. 8 is a flowchart illustrating procedure of the image processing at the image processing apparatus 100. Note that, because processing from step S501 to S503 and processing from step S506 to S508 are similar to those in Embodiment 1, description thereof will be omitted here.

In step S504, first, luminance Cd_P of the diffuse reflected light of the print piece and luminance Cd_R of normal reflected light are calculated based on the derived observing condition (illumination intensity Lt [lx], and luminance Wt [cd/m²] in the incident angle direction), the diffuse reflectance characteristics (Pd) and the specular reflection characteristics (Rd). Further, a sum Cd of the luminance which reaches the eyes of the observer is calculated using the following equation based on the luminance Cd_P of the diffuse reflected light of the print piece and the luminance Cd_R of the normal reflected light.

$$Cd\_P = PdY/100 \times Lt/\pi \quad (4)$$

$$Cd\_R = RdY/100 \times Wt \; [cd/m2] \quad (5)$$

Here, π indicates a circle ratio, PdY indicates a Y component in tristimulus values XYZ of the diffuse reflectance characteristics, and RdY indicates a Y component in tristimulus values XYZ of the specular reflection characteristics.

$$Cd = Cd\_P + Cd\_R \quad (6)$$

The print luminance value estimating unit 207 then determines whether or not the sum Cd of the luminance is calculated for all the patches (S505). Then, if it is determined that calculation of the sum Cd of the luminance of the diffuse reflected light is not finished for all the patches (S505: No), the image processing apparatus 100 returns the processing to step S504, and calculates the sum Cd of the luminance of the diffuse reflected light for all the patches.

In the present embodiment, the diffuse reflectance characteristics and the specular reflection characteristics regarding respective pieces of the image data are derived by converting gradation of the input RGB image (whose luminance is linear) which is obtained by equally dividing the image into five portions on a gray line, by the printer gradation converting unit 213 using the printer gamma table 212. That is, the diffuse reflectance characteristics and the specular reflection characteristics regarding respective pieces of the image data are derived by converting gradation of five patches of the input image (R, G, B)=(255, 255, 255) . . . (0, 0, 0) whose luminance is linear, based on the printer gamma table 212.

As described above, in the present embodiment, in addition to the illumination intensity, the luminance in the incident angle direction is set. Further, print luminance to be perceived by the observer is estimated using the set illumination intensity and the luminance in the incident angle direction, and the diffuse reflectance characteristics and the specular reflection characteristics of the print piece measured in advance. In addition, an example has been described where an image appropriate for the observation environment is produced while the converting characteristics are set such that the "tilts of the output luminance in the linear regions become the same" and the "linear region with respect to the luminance (chroma) of the input image increases" according to the reproducing range of the estimated print luminance.

Note that, in the above-described embodiment, the converting characteristics are set such that the linear region with respect to the luminance of the input image increases as the reproducing range of the estimated print luminance becomes larger. However, print chroma may be estimated from the tristimulus values PdX, PdY and PdZ of the diffuse reflectance characteristics and tristimulus values RdX, RdY and RdZ of the specular reflection characteristics illustrated in FIG. 14. Then, the converting characteristics may be set such that, in the case where the reproducing ranges of the estimated print chromatic characteristics are different, the "tilts of the output chroma in the linear regions become the same" and the "linear region with respect to the chroma of the input image increases".

Embodiment 4

As described above, in the above-described Embodiments 1 and 2, examples have been described where the converting characteristics of the image data for locally controlling illumination at the illuminating apparatus are set such that the "tilts of the output luminance in the linear regions become the same" and the "linear region with respect to the luminance (chroma) of the input image increases".

Further, in Embodiment 3, the luminance in the incident angle direction is added as a condition for estimating the print luminance. Then, an example has been described where the converting characteristics of the image data for locally controlling illumination at the illuminating apparatus are set such that the "tilts of the output luminance in the linear regions become the same" and the "linear region with respect to the luminance of the input image increases" according to the reproducing range of the print luminance.

Figure 21:
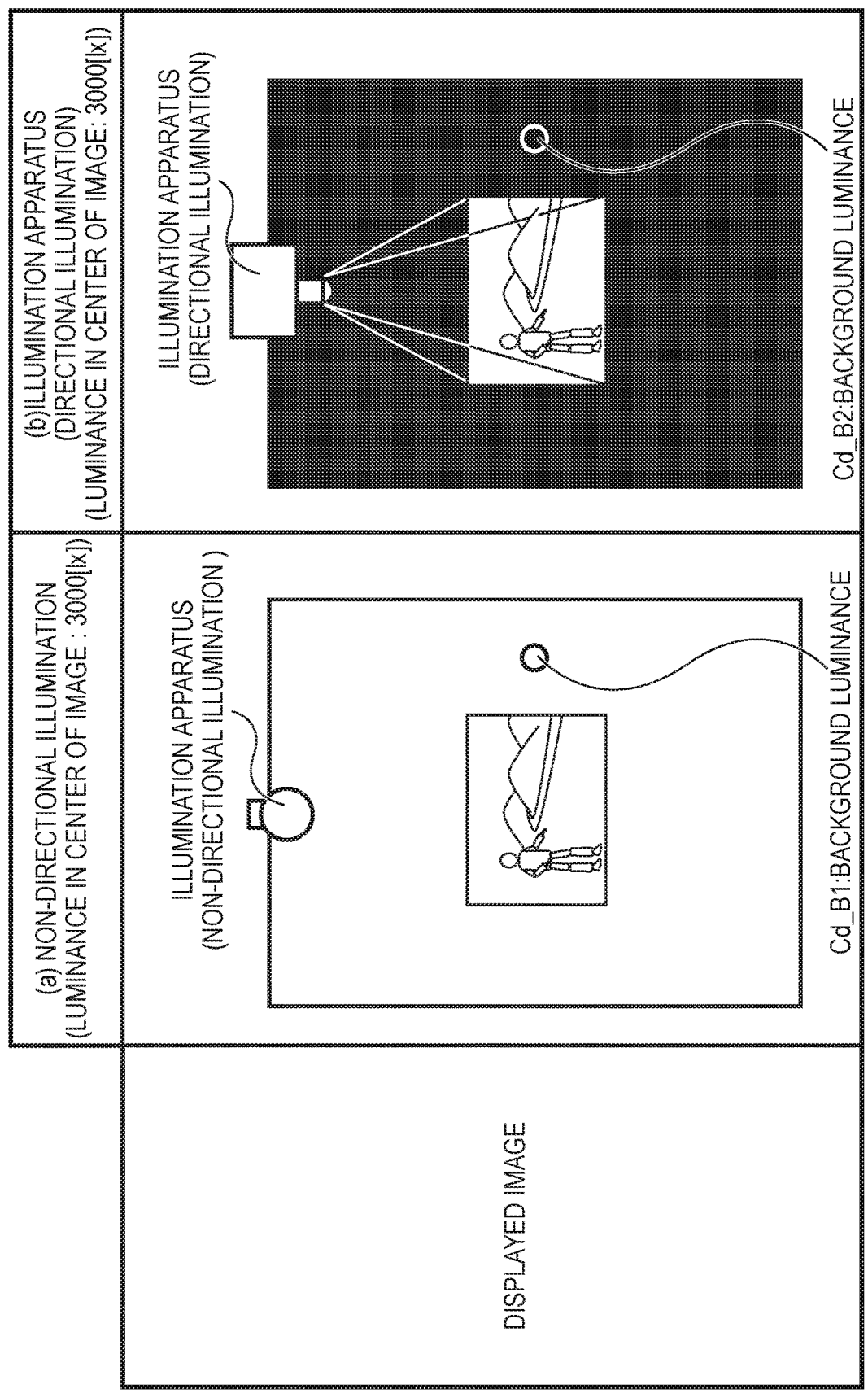
FIG. 21 is a diagram illustrating perceived change of density due to an exhibiting environment.

However, there may be other factors which may change visual density of the print piece, in addition to the maximum illumination intensity of the illuminating apparatus and the luminance in the incident angle direction. Here, for example, as illustrated in FIG. 21, a case will be considered where a print piece (that is, an image printed on a print piece) which is exhibited by being hung on a wall is observed. (a) in FIG. 21 illustrates a print piece (image) exhibited under illumination of the illuminating apparatus having non-directional lighting, and (b) in FIG. 21 illustrates a print piece (image) exhibited at maximum illumination intensity of the illuminating apparatus having directional lighting. Note that the maximum illumination intensity of the illuminating apparatus is indicated as illumination intensity in the case where, for example, white ((R, G, B)=(255, 255, 255)) is set for the whole surface as the image data in the case where the illuminating apparatus is a projector.

In (a) in FIG. 21, because light is radiated so that illumination intensity at a central portion of the image becomes 3000 [lx] by non-directional lighting, and light is radiated on both an image portion and background of a non-image portion (a portion other than the image), the whole observation environment becomes bright. That is, luminance Cd_B1 of the background of the non-image portion becomes bright. Note that the background of the non-image portion is indicated as a region other than the print piece (image) among the region of the wall on which the print piece (image) is hung. Further, while, in FIG. 21, a right region of the image portion is indicated as the background of the non-image portion, a left region, a region above or a region below the image portion may be set as the background of the non-image portion. Meanwhile, in (b) in FIG. 21, because light is radiated so that the illumination intensity at a central portion of the image becomes 3000 [lx] by directional lighting, and light is radiated only on the image portion, luminance Cd_B2 of the background of the non-image portion becomes dark.

As additional information, in both (a) in FIG. 21 and (b) in FIG. 21, it is assumed that illumination intensity at the centers of the image portions is 3000 [lx], and luminance value distribution in the image portions is the same. That is, in the case where luminance of the only image portions is measured, both luminance exhibits the same value.

Here, if the observer observes the images in (a) in FIG. 21 and (b) in FIG. 21, typically, the observer often perceives that a portion from a halftone portion to a highlight portion of the print piece is white skipped in the image in (b) in FIG. 21 compared to the image in (a) in FIG. 21. That is, if the print piece is seen under the directional lighting as in (b) in FIG. 21, the print piece looks as if imaging were performed in an overexposure state for several levels. This is because sight of the observer is adjusted to the luminance of background of the non-image portion which comes into sight of the observer when the observer sees the image.

Concerning this point, more specifically, for example, the luminance of background to which the sight of the observer is to be adjusted is relatively high under non-directional lighting in (a) in FIG. 21. Therefore, the luminance of a brightest portion of the image and an important color portion such as skin does not become so high with respect to the luminance to which the sight of the observer is to be adjusted. Meanwhile, under directional lighting in (b) in FIG. 21, the luminance of the background to which the sight of the observer is to be adjusted is relatively low. Therefore, as described above, the print piece looks as if imaging were performed in an overexposure state for several levels, and the observer perceives that the portion from the halftone portion to the highlight portion is white skipped.

This is because contrast between the luminance of the background and the luminance of the brightest portion contributes to change in visual density of the print piece (image). Note that, while, in the above description, the contrast between the luminance of the background and the luminance of the brightest portion is used, the luminance at a portion which is relatively bright, such as luminance of skin, or the like, or the luminance of important color of sky, or the like, may be used as the luminance of the brightest portion.

Figure 22:
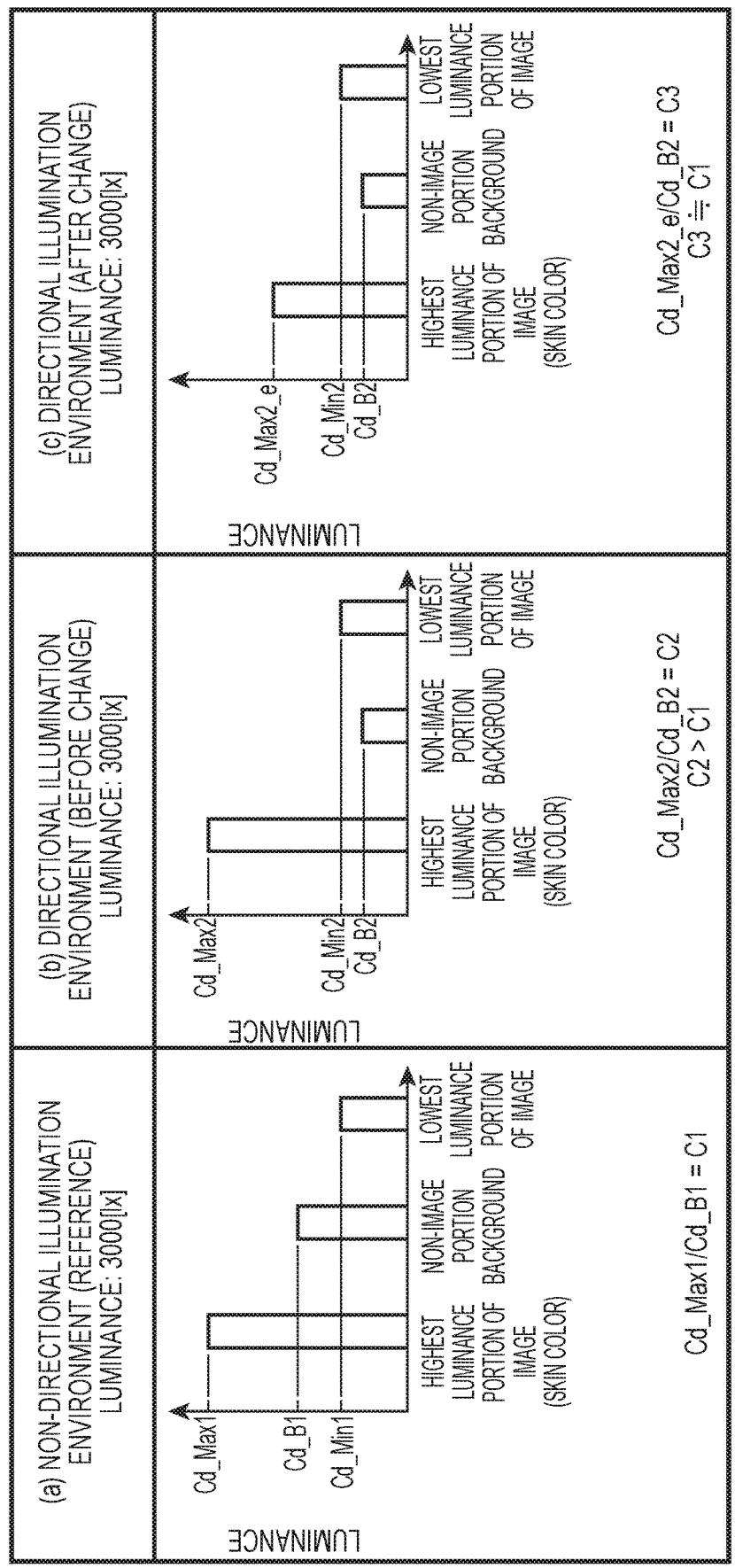
FIG. 22 is a diagram illustrating luminance of a brightest portion of an image, luminance of background of a non-image portion, and luminance of a darkest portion of the image in the exhibiting environment.

In light of these, study of suppression of change in visual density perceived by the observer in the case where a difference between the luminance of the image portion and the luminance of the background of the non-image portion is large to some extent, will be described below. FIG. 22 is a diagram illustrating the luminance of the brightest portion in the image in an exhibiting environment (non-directional lighting and directional lighting), the luminance of the background of the non-image portion, and the luminance of the darkest portion in the image.

(a) in FIG. 22 illustrates the luminance of the brightest portion of the image (a maximum value of the print luminance estimated value Cd) Cd_Max1, the luminance of the background of the non-image portion Cd_B1, and the luminance of the darkest portion of the image (a minimum value of the print luminance) Cd_Min1 under a non-directional lighting environment. Here, a contrast value of the luminance Cd_Max1 of the brightest portion of the image with respect to the luminance Cd_B1 of the background of the non-image portion, that is, Cd_Max1/Cd_B1 is set as C1.

Further, (b) in FIG. 22 illustrates the luminance of the brightest portion of the image (a maximum value of the print luminance estimated value Cd) Cd_Max2, the luminance of the background of the non-image portion Cd_B2, and the luminance of the darkest portion of the image (a minimum value of the print luminance) Cd_Min2 under directional lighting. Here, a contrast value of the luminance of the brightest portion of the image Cd_Max2 with respect to the luminance of the background of the non-image portion Cd_B2, that is, Cd_Max2/Cd_B2 is set as C2.

Here, because illuminance of the center of the image is 3000 [lx], in (a) in FIG. 22 and (b) in FIG. 22, luminance distribution in the image portions is the same. That is, the luminance of the brightest portions of the images Cd_Max1 and Cd_Max2 exhibit substantially the same value. In a similar manner, the luminance of the darkest portions of the images Cd_Min1 and Cd_Min2 also exhibit substantially the same value.

However, because the luminance of the background of the non-image portions Cd_B1 and Cd_B2 have relationship of Cd_B1>Cd_B2, and the luminance to which the sight of the observer is to be adjusted is different between (a) in FIG. 22 and (b) in FIG. 22, the observer perceives that the image in (b) in FIG. 22 is white skipped compared to the image in (a) in FIG. 22. Further, when the contrast value C1 in (a) in FIG. 22 is compared with the contrast value C2 in (b) in FIG. 22, C1<C2.

Therefore, in the present embodiment, to make visual impression of the images the same between (a) in FIG. 22 and (b) in FIG. 22, it is studied to make the contrast value C1 in (a) in FIG. 22 the same as the contrast value C2 in (b) in FIG. 22. Specifically, in FIG. 22, it is studied to change the luminance of the images so that the contrast value of the luminance of the brightest portion of the image Cd_Max2 with respect to the luminance of the background of the non-image portion Cd_B2, that is, Cd_Max2/Cd_B2=C2 becomes substantially the same as C1.

Therefore, for example, if the luminance of the brightest portion of the image Cd_Max2 in (b) in FIG. 22 can be suppressed to be Cd_Max2_e as illustrated in (c) in FIG. 22 (that is, if illumination intensity of the illuminating apparatus is lowered), it is possible to make the contrast value the same as the contrast value C1. Specifically, by lowering the luminance of the brightest portion of the image from Cd_Max2 to Cd_Max2_e, it is possible to make the contrast value C3 of the luminance of the brightest portion of the image Cd_Max2_e with respect the luminance of the background of the non-image portion Cd_B2 the same as the contrast value C1. That is, it is possible to make a change so that visual impression of the images becomes the same.

Note that, while, in FIG. 22, description has been provided assuming that Cd_Max1 and Cd_Max2 are the luminance of the brightest portions of the images (maximum values of the print luminance), Cd_Max1 and Cd_Max2 may be the luminance of a relatively bright portion such as skin or the luminance of important color of sky, or the like. Further, it is also possible to use a value obtained by subtracting the luminance of the darkest portion of the image from the luminance of the brightest portion of the image and dividing the result by the luminance of the background of the non-image portion, as the contrast value. That is, it is also possible to change the luminance of Cd_Max2_e so that C3 becomes equal to C1 assuming that (Cd_Max1−Cd_Min1)/Cd_B1 is C1, and (Cd_Max2_e−Cd_Min2)/Cd_B2 is C3. In either case, by changing the luminance of the brightest portion of the image so that contrast of the luminance of the brightest portions of the images with respect to the luminance of the background of the non-image portions becomes the same, it is possible to make a change so that visual impression of the images becomes the same. Functions (processing) for suppressing change in visual density perceived by the observer will be specifically described below.

(Functional Configuration of Image Processing Apparatus)

A functional configuration of the image processing apparatus according to the present embodiment is similar to that of the image processing apparatus according to Embodiment 1, and is illustrated in the block diagram in FIG. 3. Note that the functions illustrated in FIG. 3 are realized by programs for realizing these functions being supplied to the image processing apparatus 100 illustrated in FIG. 2, and further, being executed by the image processing apparatus 100 in a similar manner to Embodiment 1. Further, functions of components other than the observing condition deriving unit 204, the print luminance value estimating unit 207, the target luminance characteristics setting unit 208 and the illumination converting characteristics setting unit 209 are similar to those in the image processing apparatus 100 in Embodiment 1, description will be omitted here.

Figure 23:
FIG. 23 is a diagram illustrating the GUI provided by the observing condition deriving unit.

The observing condition deriving unit 204 derives the observing condition set by the user, using a GUI illustrated in FIG. 23 which will be described later. The print luminance value estimating unit 207 calculates (estimates) luminance of diffuse reflected light of the print piece in the observation environment from the illumination intensity derived by the observing condition deriving unit 204 and print reflectance characteristics held in the reflectance characteristics holding unit 206. The target luminance characteristics setting unit 208 sets target luminance characteristics to be reproduced based on background luminance (luminance of background of a non-image portion) perceived by the observer, which is derived by the observing condition deriving unit 204 and the print luminance estimated by the print luminance value estimating unit 207. The illumination converting characteristics setting unit 209 sets converting characteristics for converting image data to be output to the illuminating apparatus 113 based on a difference between the target luminance characteristics set at the target luminance characteristics setting unit 208 and the print luminance estimated by the print luminance value estimating unit 207.

(Observing Condition Deriving Unit)

The GUI provided by the observing condition deriving unit 204 will be described next using FIG. 23. The user sets the observing condition using the GUI illustrated in FIG. 23. The user selects "select candidate" for intuitively inputting the illumination intensity on the print piece and the luminance of the background of the non-image portion, or "numerical value setting" for inputting the illumination intensity and the luminance of the background of the non-image portion with numerical values (physical values), through check boxes on the GUI illustrated in FIG. 23. As additional information, the luminance of the background of the non-image portion in FIG. 23 is luminance indicated as, for example, Cd_B1 and Cd_B2 in FIG. 21 as described above.

In the case where "select candidate" is selected, as a candidate for the illumination intensity, illumination intensity is selected from, for example, very high (daytime outdoor), high (illumination in museum of art), normal (office), slightly dark (home), or the like. In addition, as a candidate of the luminance of the background of the non-image portion, the luminance of the background of the non-image portion is selected from, for example, very bright (white), bright (light gray), normal (gray), dark (black), or the like.

Further, in the case where "numerical value setting" is selected, concerning the illumination intensity, the illumination intensity (a value of the illuminance lux (Lx)) on the print piece is input in a text box or specific illumination intensity is selected by a slider bar being moved to right and left. In addition, also concerning the background luminance of the non-image portion, in a similar manner, luminance of the background of the non-image portion perceived by the observer is input as a luminance value (cd/m$^2$) or specific luminance of the background of the non-image portion is selected by a slider bar being moved to right and left. As a candidate selected as the "select candidate", illuminance lux corresponding to the candidate is set, and, for example, if normal (office) is selected as the illumination intensity, the subsequent processing is executed assuming that 800 [lx] is selected. Further, in a similar manner, as the luminance of the background of the non-image portion, if normal (gray) is selected, the subsequent processing is executed assuming that 50 [cd/m$^2$] is selected.

Note that, while, at the illuminating apparatus used in the present embodiment, the illumination intensity can be locally controlled, the user is allowed to select illumination intensity upon radiation at maximum illumination intensity which can be radiated on the whole surface as the illumination intensity here. For example, in the case where the illuminating apparatus 113 is a projector, illumination intensity in the case where white ((R, G, B)=(255, 255, 255)) is set for the whole surface as the image data is selected by the user. That is, if the illuminating apparatus 113 is a handy type apparatus or an apparatus which can be put into a pocket, even in the case where white ((R, G, B)=(255, 255, 255)) is set for the whole surface as the image data, only low illumination intensity of approximately 300 [lx] can be obtained. Meanwhile, if the illuminating apparatus 113 is an illuminating apparatus mounted at a meeting room or an art museum, in the case where white ((R, G, B)=(255, 255, 255)) is provided for the whole surface as the image data, high illumination intensity of approximately 3000 [lx] can be obtained. In this manner, the maximum illumination intensity which can be obtained differs according to the illuminating apparatus 113 to be used.

Further, while, in the above-described embodiments, illuminance [lx] is used as the illumination intensity (luminance), the illumination intensity is not necessarily limited to this, and, for example, luminance [cd/m$^2$], [nit] can be also used. In addition, it is also possible to allow the user to select non-directional lighting or directional lighting as the illuminating apparatus. In this case, for example, it is also possible to make setting so that, in the case where non-directional lighting is selected, the luminance of the background of the non-image portion becomes relatively high (bright, (light gray)), and, in the case where directional lighting is selected, the luminance of the background of the non-image portion becomes relatively low (dark, (black)). Further, to allow the user to input the illumination intensity more correctly, it is also possible to describe on the GUI that it is necessary to measure the illuminance using an illuminance meter on a print piece to be posted or measure the luminance of the background of the non-image portion.

(Image Processing)

Image processing at the image processing apparatus 100 will be described next using FIG. 8. As described above, FIG. 8 is a flowchart illustrating procedure of the image processing at the image processing apparatus 100. Note that, because the processing in step S501 and S508 is similar to that in Embodiment 1, description thereof will be omitted here.

When the image data input by the luminance calculation unit 203 is converted into image data whose luminance is linear, the observing condition deriving unit 204 derives the observing condition (illumination intensity Lt [lx] and the luminance of the background of the non-image portion Cd_B [cd/m$^2$]) selected by the user (S502). As described above, as the illumination intensity Lt here, a value (illumination intensity) upon radiation at maximum illumination intensity which can be radiated at the illuminating apparatus 113 is derived. For example, in the case where the illuminating apparatus 113 is a projector, illumination intensity in the case where white ((R, G, B)=(255, 255, 255)) is set for the whole surface as the image data is derived. As additional information, the luminance of the background of the non-image portion is luminance indicated as, for example, Cd_B1, Cd_B2 in FIG. 21 as described above.

When the observing condition is derived by the observing condition deriving unit 204 (S502), the print luminance value estimating unit 207 derives the diffuse reflectance characteristics (Pd) from the reflectance characteristics holding unit 206 (S503). The print luminance value estimating unit 207 calculates the luminance Cd of the diffuse reflected light of the print piece based on the derived observing condition (the illumination intensity Lt [lx]) and the diffuse reflectance characteristics (Pd) (S504).

Note that the luminance Cd of the diffuse reflected light of the print piece can be calculated using the following equation.

$$Cd = PdY/100 \times Lt/\pi \text{ [cd/m2]} \quad (7)$$

Here, $\pi$ indicates a circle ratio, PdY indicates a Y component in tristimulus values XYZ of the diffuse reflectance characteristics, and PdY falls within a range between 0.77 and 90.3 in a similar manner to FIG. 5 of Embodiment 1.

The print luminance value estimating unit 207 determines whether or not the luminance Cd of the diffuse reflected light is calculated for all the patches (S505). Then, if it is determined that calculation of the luminance Cd of the diffuse reflected light is not finished for all the patches (S505: No), the image processing apparatus 100 returns the processing to step S504, and calculates the luminance Cd of the diffuse reflected light for all the patches.

As described above, in the present embodiment, the diffuse reflectance characteristics regarding respective pieces of the image data are derived by converting gradation of the input RGB image (whose luminance is linear) which is obtained by equally dividing the image into five portions on a gray line, by the printer gradation converting unit 213 using the printer gamma table 212. That is, the print reflectance characteristics regarding respective pieces of the image data are derived by converting gradation of five patches of the input image (R, G, B)=(255, 255, 255) . . . (0, 0, 0) whose luminance is linear using the printer gamma table 212.

The target luminance characteristics setting unit 208 sets the target luminance characteristics to be reproduced as the print piece based on the luminance Cd of the diffuse reflected light of the print piece, calculated at the print luminance value estimating unit 207 and the luminance Cd_B of the background of the non-image portion, derived by the observing condition deriving unit 204 (S506).

Note that, in the present embodiment, before the target luminance characteristics T_Cd are set, tentative target luminance characteristics I_Cd are set. Here, the tentative target luminance characteristics I_Cd are similar to the target luminance characteristics T_Cd in Embodiment 1. That is, the tentative target luminance characteristics I_Cd are set such that, in the case where the reproducing ranges of the print luminance characteristics are different, the tilt of the output luminance in the linear region in the case where the reproducing range is relatively small matches the tilt of the output luminance in the linear region in the case where the reproducing range is relatively large.

Figure 25:
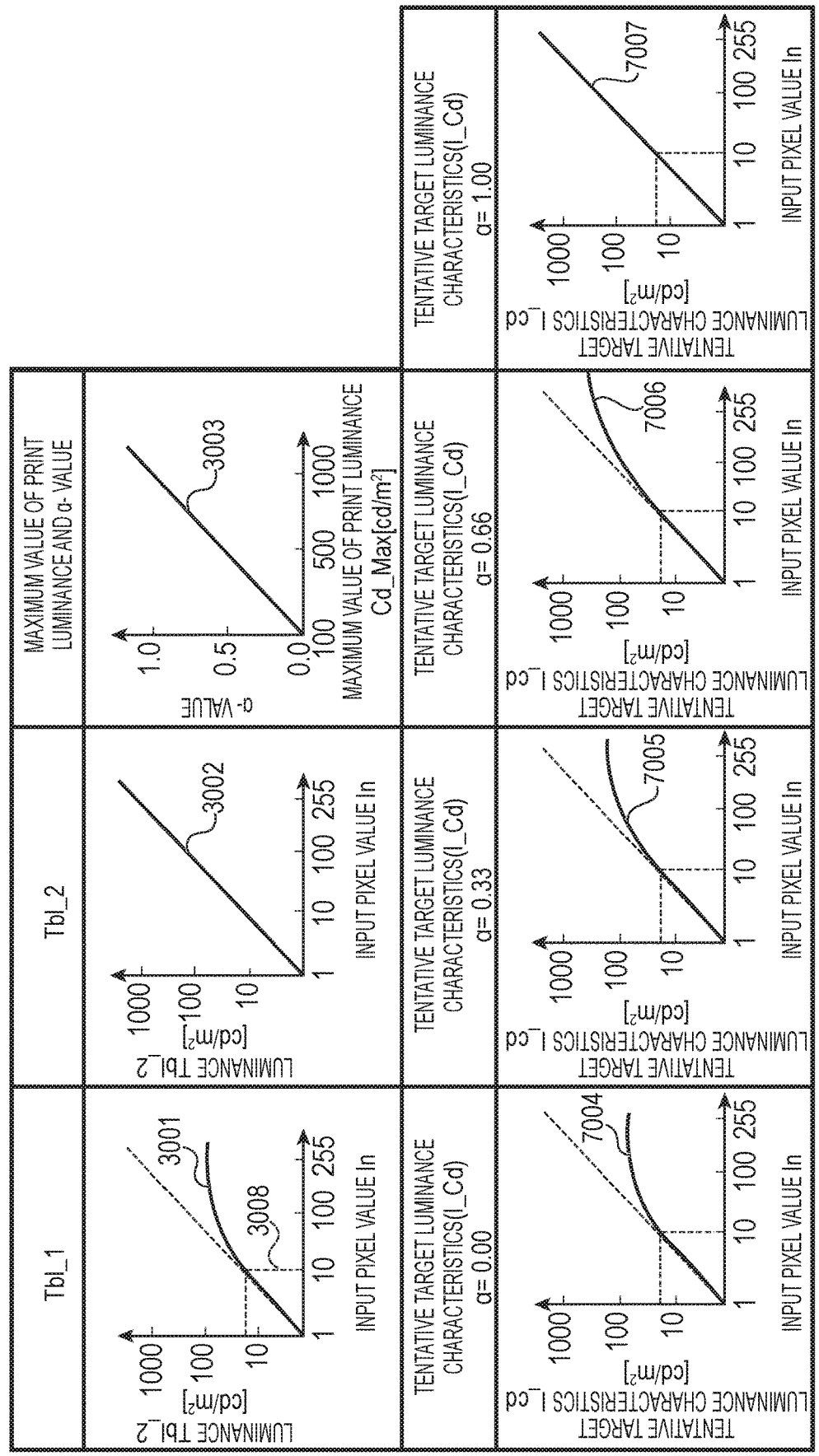
FIG. 25 is a diagram illustrating a method for setting the tentative target luminance characteristics at the target luminance characteristics setting unit.

Further, a method for setting the tentative target luminance characteristics I_Cd is similar to the method for setting the target luminance characteristics T_Cd described above in step S506 in Embodiment 1. That is, as illustrated in FIG. 25, the tentative target luminance characteristics I_Cd are calculated from two different tables (Tbl_1, Tbl_2) prepared in advance, and a function of a weighting $\alpha$ value according to the maximum value Cd_Max [cd/m²] of the print luminance estimated value Cd.

Further, here, the maximum value Cd_Max of the print luminance estimated value (luminance of the diffuse reflected light of the print piece) Cd is also calculated based on equation (7) in a similar manner to Embodiment 1. Therefore, for example, in a case of the illumination intensity: 3000 [lx] in FIG. 22, the maximum value Cd_Max of the print luminance estimated value Cd is calculated as approximately 1000 [cd/m²].

Figure 24:
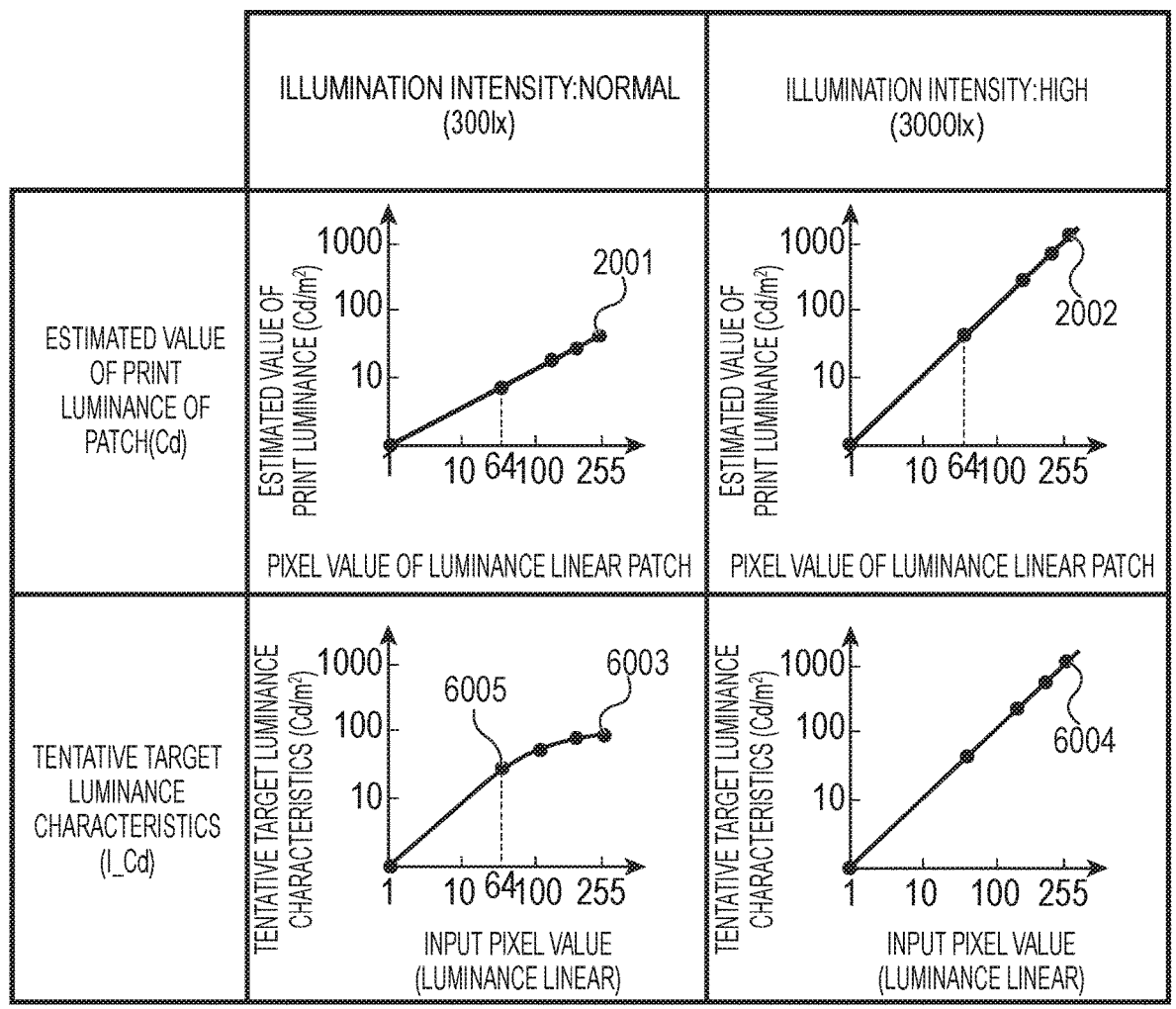
FIG. 24 is a diagram illustrating tentative target luminance characteristics.

Description of the method for setting the tentative target luminance characteristics I_Cd according to the present embodiment will be complemented below using FIG. 24. As described above, FIG. 24 illustrates the print luminance estimated value Cd of the patch, which is estimated according to the illumination intensity, and the tentative target luminance characteristics I_Cd set based on the print luminance estimated value.

In a similar manner to Embodiment 1, the tentative target luminance characteristics I_Cd in a case of the illumination intensity: normal (300 [lx]) have linear characteristics from a shadow portion to a halftone portion (in a region where the input pixel value is less than 64 (6005)). Further, converting characteristics curve from the halftone portion to a highlight portion (in a region where the input pixel value is greater than 64 (6005)) and have non-linear characteristics (6003). Meanwhile, the tentative target luminance characteristics I_Cd in a case of the illumination intensity: high (3000 [lx]) have linear characteristics from the shadow portion to the highlight portion (6004).

In this case, the tentative target luminance characteristics I_Cd set at the target luminance characteristics setting unit 208 are calculated based on the following equation in a similar manner to Embodiment 1.

$$I\_Cd(In) = (1 - \alpha(Cd\_Max)) \times Tbl\_1(In) + \alpha(Cd\_Max) \times Tbl\_2(In) \quad (8)$$

Note that In is the input pixel value (0≤In≤255). Further, Tbl_1(In) is a luminance value of Tbl_1 at the input pixel value In, and Tbl_2(In) is a luminance value of Tbl_2 at the input pixel value In. Then, the tentative target luminance characteristics I_Cd calculated from the above equation in the case where the weighting $\alpha$ value is made to fluctuate to $\alpha$=0.00 (7004), $\alpha$=0.33 (7005), $\alpha$=0.66 (7006) and $\alpha$=1.00 (7007) are indicated in a lower part of FIG. 25. Referring to FIG. 25, it can be understood that the tentative target luminance characteristics I_Cd are set such that, in the case where the reproducing ranges of the print luminance characteristics are different, the tilt of the output luminance in the linear region in the case where the reproducing range is relatively small matches the tilt of the output luminance in the linear region in the case where the reproducing range is relatively large. That is, it can be understood that the tentative target luminance characteristics I_Cd are similar to the target luminance characteristics T_Cd in Embodiment 1. As additional information, in this case, as described in Embodiment 2, the target luminance characteristics may be set such that the linear region increases as the reproducing range of the estimated print luminance characteristics becomes larger.

Then, if the tentative target luminance characteristics I_Cd are calculated as described above, the target luminance characteristics T_Cd to be reproduced as the print piece are then set (calculated) based on the background luminance Cd_B [cd/m²]. Note that, in the present embodiment, it is assumed that the background luminance Cd_B under a predetermined environment, the luminance of the brightest portion of the image (a maximum value of the print luminance) Cd_Max and the contrast value are held in advance to set the target luminance characteristics T_Cd. For example, in the case where the predetermined environment is set as an environment of non-directional lighting illustrated in (a) in FIG. 22, the background luminance Cd_B1, the luminance of the brightest portion of the image (the maximum value of the print luminance) Cd_Max1, and the contrast value C1=Cd_Max1/Cd_B1 are held as reference targets.

Here, the target luminance characteristics T_Cd to be reproduced as the print piece (specifically, the target luminance characteristics T_Cd in an environment of the illuminating apparatus having directional lighting in (b) in FIG. 22) are calculated using the following equation. More specifically, the target luminance characteristics T_Cd to be reproduced as the print piece are calculated using the following equation based on the illumination intensity Lt [lx] (3000 [lx] in (b) in FIG. 22), the background luminance Cd_B [cd/m$^2$] (Cd_B2 [cd/m$^2$] in (b) in FIG. 22).

$$T\_Cd = I\_Cd \times C1/C \quad (9)$$

Note that, in the above equation (9), I_Cd is the tentative target luminance characteristics in an environment which is a calculation target (specifically, the environment in (b) in FIG. 22). Further, C1 is a contrast value under the predetermined environment (specifically, under the environment in (a) in FIG. 22) which is used as a reference target (reference). Still further, C is a contrast value under the environment which is a calculation target of the target luminance characteristics T_Cd, and, in the present embodiment, is expressed with the following equation as a ratio of the print luminance maximum value Cd_Max with respect to the background luminance Cd_B.

$$C = Cd\_Max/Cd\_B \quad (10)$$

That is, under the environment in (b) in FIG. 22, the contrast value C is expressed as C=Cd_Max2/Cd_B2 based on the above equation.

In this manner (that is, as expressed in the above equation (9)), in the case where the contrast value C under the environment which is the calculation target is greater than the contrast value C1 which is the reference, the target luminance characteristics T_Cd are set smaller. Meanwhile, in the case where the contrast value C under the environment which is the calculation target is smaller than the contrast value C1 which is the reference, the target luminance characteristics T_Cd are set greater. That is, the target luminance characteristics T_Cd are set such that the contrast value matches the contrast value C1 which is the reference.

Here, as expressed with the above equation (9), the reason why the target luminance characteristics T_Cd are set is to, as described above, suppress change in visual density perceived by the observer by making the contrast value the same as the contrast value under the predetermined environment which is the reference.

Note that, while, in the above description, the contrast is defined as a ratio of the luminance of the brightest portion of the image with respect to the luminance of the background of the non-image portion, the contrast is not necessarily limited to this. Therefore, for example, the target luminance characteristics T_Cd may be calculated such that the contrast values become the same as the luminance at a portion where the luminance is relatively bright, such as skin, or the luminance of important color of sky, or the like, in place of the luminance of the brightest portion of the image (print luminance maximum value).

Further, a value obtained by subtracting the luminance of the darkest portion of the image from the luminance of the brightest portion of the image and dividing the result by the luminance of the background of the non-image portion can be also used as the contrast value. That is, the contrast value C may be set such that C=(Cd_Max−Cd_Min)/Cd_B. Further, the contrast value C may be subjected to logarithmic operation such as C=Log(Cd_Max/Cd_B), or exponential operation such as C=(Cd_Max/Cd_B)^n (where n is a real number). In either case, by changing the target luminance characteristics T_Cd so that the contrast values of the luminance of the brightest portions of the images with respect to the luminance of the background of the non-image portions become the same, it is possible to suppress change in visual density perceived by the observer. That is, it is possible to make visual impression of the images substantially the same.

In addition, in the present embodiment, an example has been described where the tentative target luminance characteristics I_Cd are set such that, even in the case where the reproducing ranges of the print luminance characteristics are different, the tilts of the output luminance in the linear regions become the same by using the two different tables. However, setting of the tentative target luminance characteristics I_Cd is not necessarily limited to the above-described method, and, for example, the target luminance characteristics T_Cd may be defined with a spline function, and a curve of the spline function may be set so that the tilts of the output luminance in the linear regions become the same.

Here, returning to FIG. 8, the illumination converting characteristics setting unit 209 sets the converting characteristics Out_Tbl using the print luminance estimated value Cd of the patch estimated by the print luminance value estimating unit 207 and the target luminance characteristics T_Cd set at the target luminance characteristics setting unit 208 (S507). The converting characteristics Out_Tbl are set such that the print luminance estimated value Cd becomes the target luminance characteristics T_Cd in a similar manner to Embodiment 1.

That is, at the illumination converting characteristics setting unit 209, the converting characteristics Out_Tbl are set based on a ratio of the print luminance estimated value Cd with respect to the target luminance characteristics T_Cd for each gradation. Then, by the converting characteristics Out_Tbl being set in this manner, it is possible to make the print luminance estimated value approach the target luminance characteristics T_Cd in all gradations.

Specifically, the converting characteristics Out_Tbl are calculated based on the following equation.

$$Out\_Tb1(\text{In}) = T\_Cd(\text{In})/Cd(\text{In}) \times \text{In} \quad (11)$$

Note that In is the input pixel value (0≤In≤255). Further, T_Cd(In) is target luminance characteristics at the input pixel value In, and Cd(In) is a print luminance estimated value at the input pixel value In.

As described above, in the present embodiment, an example has been described where change in visual density perceived by the observer, which is caused due to a difference in the luminance of the background of the non-image portions (that is, a difference in contrast) can be suppressed.

Embodiment 5

In the above-described embodiments, examples have been described where the converting characteristics of the image data for locally controlling illumination at the illuminating apparatus are set such that the "tilts of the output luminance in the linear regions become the same" according to the reproducing range of the print luminance (chroma) estimated from the illumination intensity. Further, at the same time, examples have been described where the converting characteristics of the image data for locally controlling illumination at the illuminating apparatus are set such that the "linear region with respect to the luminance (chroma) of the input image increases" according to the reproducing range of the print luminance (chroma) estimated from the illumination intensity.

However, a setting target of the converting characteristics are not necessarily limited to gradation characteristics at the illumination gradation converting unit 210. Therefore, for example, at the illumination processing unit 211 illustrated in the above-described FIG. 19, setting (control) may be performed at one or both of the spatial filter processing unit 801 and the CMS processing unit 802.

In this case, at the spatial filter processing unit 801, a filter table 803 may be changed or set. Further, at the CMS processing unit 802, color profile 804 may be changed or set. In either case, the converting characteristics of the image data may be set such that the "tilts of the output luminance (chroma) in the linear regions become the same" and the "linear region with respect to the luminance (chroma) increases" according to the reproducing range of the estimated print luminance (chroma).

OTHER EMBODIMENTS

The present invention can be also realized through processing of supplying programs which realize one or more functions of the above-described embodiments to a system or an apparatus via a network or a storage medium and reading out and executing by one or more processors at a computer of the system or the apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-221979, filed Nov. 17, 2017, which is hereby incorporated by reference herein in its entirety.

What is claimed is:

1. An image processing apparatus that converts, according to intensity of light radiated on an image printed based on an input image data, the input image data into image data for illumination output to be superimposed on the image by an illuminating apparatus, the image processing apparatus comprising:
   one or more processors; and
   one or more memories storing instructions, when executed by the one or more processors, causing the image processing apparatus to function as:
      a deriving unit that derives an observing condition upon radiation at illumination intensity of the illumination apparatus;
      an estimating unit that estimates print luminance characteristics corresponding to the image based on the observing condition and reflectance characteristics corresponding to the image;
      a target luminance characteristics setting unit that sets target luminance characteristics in the observing condition based on the print luminance characteristics;
      an illumination converting characteristics setting unit that sets illumination converting characteristics for converting the input image data into the image data for illumination output based on the print luminance characteristics and the target luminance characteristics; and
      a converting unit that converts gradation of the input image data using the illumination converting characteristics,
   wherein the target luminance characteristics setting unit sets the target luminance characteristics such that, in a case where ranges of the print luminance characteristics are different, a linear region of output luminance in a case where the range is large becomes larger than a linear region of output luminance in a case where the range is small.

2. The image processing apparatus according to claim 1, wherein the target luminance characteristics setting unit sets the target luminance characteristics such that, in a case where ranges of the print luminance characteristics are different, a tilt of output luminance in a linear region in a case where the range is small matches a tilt of output luminance in a linear region in a case where the range is large.

3. The image processing apparatus according to claim 1, wherein the deriving unit derives at least illumination intensity of light radiated on the image as the observing condition, and
   the estimating unit performs estimation based on at least diffuse reflectance characteristics as the reflectance characteristics.

4. The image processing apparatus according to claim 3, wherein the deriving unit further derives luminance in an incident angle direction of light facing positional relationship between an observation position and the image as the observing condition, and the estimating unit performs estimation further based on specular reflection characteristics as the reflectance characteristics.

5. The image processing apparatus according to claim 4, wherein, in the reflectance characteristics, a number of values of diffuse reflectance provided as the diffuse reflectance characteristics is different from a number of values of specular reflectivity provided as the specular reflection characteristics.

6. The image processing apparatus according to claim 3, wherein the deriving unit further derives background luminance of a portion other than the image perceived by an observer as the observing condition, and the target luminance characteristics setting unit further sets a contrast value of luminance of a brightest portion of the image with respect to the background luminance when directional lighting is radiated on the image, and sets the target luminance characteristics based on the print luminance characteristics and the contrast value.

7. The image processing apparatus according to claim 6, wherein the target luminance characteristics setting unit sets the target luminance characteristics such that the contrast value becomes substantially same as a contrast value of the luminance of the brightest portion of the image with respect to the background luminance when non-directional lighting is radiated on a central portion of the image at illumination intensity similar to illumination intensity of light radiated on a central portion of the image when the contrast value is set.

8. The image processing apparatus according to claim 4, wherein the illumination intensity or the illumination intensity and the luminance in the incident angle direction is set by a user.

9. The image processing apparatus according to claim 6, wherein the illumination intensity or the illumination intensity and the background luminance of the portion other than the image is set by a user.

10. The image processing apparatus according to claim 1, wherein, in the input image data, a pixel value and scene luminance have linear relationship.

11. An image processing apparatus that converts, according to intensity of light radiated on an image printed based on an input image data, the input image data into image data for illumination output to be superimposed on the image by an illuminating apparatus, the image processing apparatus comprising:
one or more processors; and
one or more memories storing instructions, when executed by the one or more processors, causing the image processing apparatus to function as:
a deriving unit that derives an observing condition upon radiation at illumination intensity of the illuminating apparatus;
an estimating unit that estimates print chromatic characteristics corresponding to the image based on the observing condition and reflectance characteristics corresponding to the image;
a target luminance characteristics setting unit that sets target chromatic characteristics in the observing condition based on the print chromatic characteristics;
an illumination converting characteristics setting unit that sets illumination converting characteristics for converting the input image data into the image for illumination output based on the print chromatic characteristics and the target chromatic characteristics; and
a converting unit that converts gradation of the input image data using the illumination converting characteristics,
wherein the target luminance characteristics setting unit sets the target chromatic characteristics such that, in a case where ranges of the print chromatic characteristics are different, a linear region of output luminance in a case where the range is relatively large becomes larger than a linear region of output luminance in a case where the range is relatively small.

12. A non-transitory computer-readable recording medium storing a readable program for operating a computer to function as each unit of an image processing apparatus that converts, according to intensity of light radiated on an image printed based on an input image data, the input image data into image data for illumination output to be superimposed on the image by an illuminating apparatus, the image processing apparatus comprising:
a deriving unit that derives an observing condition upon radiation at illumination intensity of the illuminating apparatus;
an estimating unit that estimates print luminance characteristics corresponding to the image based on the observing condition and reflectance characteristics corresponding to the image;
a target luminance characteristics setting unit that sets target luminance characteristics in the observing condition based on the print luminance characteristics;
an illumination converting characteristics setting unit that sets illumination converting characteristics for converting the input image data into the image data for illumination output based on the print luminance characteristics and the target luminance characteristics; and
a converting unit that converts gradation of the input image data using the illumination converting characteristics,
wherein the target luminance characteristics setting unit sets the target luminance characteristics such that, in a case where ranges of the print luminance characteristics are different, a linear region of output luminance in a case where the range is large becomes larger than a linear region of output luminance in a case where the range is small.

13. An image processing method at an image processing apparatus that converts, according to intensity of light radiated on an image printed based on an input image data, the input image data into image data for illumination output to be superimposed on the image by an illuminating apparatus, the image processing method comprising:
deriving an observing condition upon radiation at illumination intensity of the illuminating apparatus;
estimating print luminance characteristics corresponding to the image based on the observing condition and reflectance characteristics corresponding to the image;
setting target luminance characteristics in the observing condition based on the print luminance characteristics;
setting illumination converting characteristics for converting the input image data into the image data for illumination output based on the print luminance characteristics and the target luminance characteristics; and
converting gradation of the input image data using the illumination converting characteristics,
wherein, in setting of the target luminance characteristics, the target luminance characteristics are set such that, in a case where ranges of the print luminance characteristics are different, a linear region of output luminance in a case where the range is large becomes larger than a linear region of output luminance in a case where the range is small.

14. The image processing method according to claim 13, wherein, in setting of the target luminance characteristics, the target luminance characteristics are set such that, in a case where ranges of the print luminance characteristics are different, a tilt of output luminance in a linear region in a case where the range is small matches a tilt of output luminance in a linear region in a case where the range is large.

15. The image processing method according to claim 13, wherein, in deriving, at least illumination intensity of light radiated on the image is derived as the observing condition, and in estimating, estimation is performed at least based on diffuse reflectance characteristics as the reflectance characteristics.

16. The image processing method according to claim 15, wherein, in the deriving, luminance in an incident angle direction of light facing positional relationship between an observation position and the image is further derived as the observing condition, and in the estimating, performs estimation further based on specular reflection characteristics as the reflectance characteristics.

17. The image processing method according to claim 16, wherein, in the reflectance characteristics, a number of values of diffuse reflectance provided as the diffuse reflectance characteristics is different from a number of values of specular reflectivity provided as the specular reflection characteristics.

18. The image processing method according to claim 16, wherein, in deriving, background luminance of a portion other than the image perceived by an observer is further derived as the observing condition, and in setting of the target luminance characteristics, a contrast value of luminance of a brightest portion of the image with respect to the background luminance when directional lighting is radiated on the image is further set, and the target luminance characteristics are set based on the print luminance characteristics and the contrast value.

* * * * *